(12) United States Patent
Takamoto et al.

(10) Patent No.: US 10,112,151 B2
(45) Date of Patent: Oct. 30, 2018

(54) FUNCTIONAL POLYMER MEMBRANE AND METHOD FOR PRODUCING SAME

(71) Applicant: FUJIFILM Corporation, Tokyo (JP)

(72) Inventors: Tetsufumi Takamoto, Kanagawa (JP); Kuniyuki Kaminaga, Kanagawa (JP)

(73) Assignee: FUJIFILM Corporation, Minato-ku, Tokyo (JP)

( * ) Notice: Subject to any disclaimer, the term of this patent is extended or adjusted under 35 U.S.C. 154(b) by 22 days.

(21) Appl. No.: 15/248,686

(22) Filed: Aug. 26, 2016

(65) Prior Publication Data

US 2016/0361690 A1 Dec. 15, 2016

Related U.S. Application Data

(63) Continuation of application No. PCT/JP2015/055270, filed on Feb. 24, 2015.

(30) Foreign Application Priority Data

Feb. 28, 2014 (JP) ................. 2014-039930
May 1, 2014 (JP) ................. 2014-094638
Jul. 31, 2014 (JP) ................. 2014-156957

(51) Int. Cl.
*B01D 39/00* (2006.01)
*B01D 69/12* (2006.01)
(Continued)

(52) U.S. Cl.
CPC .......... *B01D 69/125* (2013.01); *B01D 61/44* (2013.01); *B01D 67/0006* (2013.01);
(Continued)

(58) Field of Classification Search
CPC ...... B01D 69/125; B01D 69/02; B01D 69/10; B01D 71/40; B01D 71/56–71/62;
(Continued)

(56) References Cited

U.S. PATENT DOCUMENTS 4,778,596 A * 10/1988 Linder ............... B01D 67/0088
210/490
5,118,717 A 6/1992 Hodgdon et al.
(Continued)

FOREIGN PATENT DOCUMENTS

JP 60-86132 A 5/1985
JP 1-236919 A 9/1989
(Continued)

OTHER PUBLICATIONS

Sumitomo Chemical, Technical Note for PES, Version 01, Sep. 2010, p. 1-4. (Year: 2010).*
(Continued)

*Primary Examiner* — Claire A Norris
*Assistant Examiner* — Julia L. Wun
(74) *Attorney, Agent, or Firm* — Sughrue Mion, PLLC

(57) ABSTRACT

A functional polymer membrane including a porous support and a crosslinked polymer electrolyte, in which the film thickness of the functional polymer membrane is smaller than 100 μm, the crosslinked polymer electrolyte is a crosslinked polymer formed by subjecting a composition including a monomer having a (meth)acrylamide skeleton to a polymerization curing reaction, and the proportion of elemental oxygen in the elemental composition excluding elemental hydrogen and helium at the surface of the porous support is from 14.0 atom % to 25.0 atom %; and a method for producing the same are provided.

15 Claims, 1 Drawing Sheet

(51) Int. Cl.
 *B01J 41/14* (2006.01)
 *B01J 47/12* (2017.01)
 *B01D 69/10* (2006.01)
 *B01D 71/40* (2006.01)
 *C08F 220/54* (2006.01)
 *B01D 61/44* (2006.01)
 *B01D 67/00* (2006.01)
 *B01J 41/04* (2017.01)
 *C08F 22/38* (2006.01)
 *C08J 5/22* (2006.01)
 *C08F 222/38* (2006.01)
 *B01D 61/00* (2006.01)
 *B01D 61/02* (2006.01)

(52) U.S. Cl.
 CPC ............ *B01D 69/10* (2013.01); *B01D 71/40* (2013.01); *B01J 41/04* (2013.01); *B01J 41/14* (2013.01); *B01J 47/12* (2013.01); *C08F 22/385* (2013.01); *C08F 220/54* (2013.01); *C08F 222/385* (2013.01); *C08J 5/2231* (2013.01); *B01D 61/002* (2013.01); *B01D 61/025* (2013.01); *B01D 2323/30* (2013.01); *B01D 2323/345* (2013.01); *B01D 2323/46* (2013.01); *B01D 2325/02* (2013.01); *B01D 2325/16* (2013.01); *B01D 2325/42* (2013.01); *C08J 2333/26* (2013.01); *C08J 2335/00* (2013.01)

(58) Field of Classification Search
 CPC .... B01D 61/44; B01D 61/025; B01D 61/002; B01D 2323/46; B01D 2323/345; B01D 2323/30; B01D 2325/02; B01D 2325/16; B01D 2325/42; B01D 67/0006; C08F 22/385; C08F 220/54; C08F 222/385; C08J 5/2231; C08J 2333/26; C08J 2335/00; B01J 47/12; B01J 41/04; B01J 41/14
 USPC ............ 210/500.33, 500.21, 500.27, 500.28, 210/500.38, 483, 488, 490, 504, 506; 427/520, 487, 490, 501
 See application file for complete search history.

(56) References Cited

U.S. PATENT DOCUMENTS

| 6,849,185 | B1* | 2/2005 | Wu ........................ A61L 2/0017 210/488 |
| 8,003,169 | B2* | 8/2011 | Misev ................... B05D 3/147 427/384 |
| 2012/0024697 | A1* | 2/2012 | Antheunis ............ B01D 67/009 204/252 |

FOREIGN PATENT DOCUMENTS

| JP | 2002-543971 A | 12/2002 |
| JP | 2011-506749 A | 3/2011 |
| JP | 2013-503038 A | 1/2013 |
| JP | 2013-27850 A | 2/2013 |
| JP | 2013-514423 A | 4/2013 |

OTHER PUBLICATIONS

International Search Report of PCT/JP2015/055270, dated Jun. 2, 2015. [PCT/ISA/210].

* cited by examiner

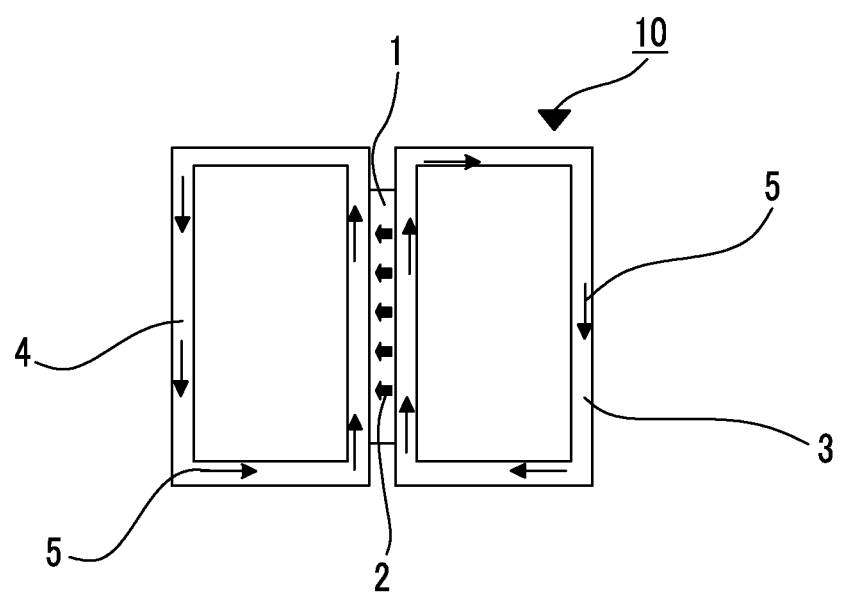

FUNCTIONAL POLYMER MEMBRANE AND METHOD FOR PRODUCING SAME

CROSS-REFERENCE TO RELATED APPLICATIONS

This application is a Continuation of PCT International Application No. PCT/JP2015/055270 filed on Feb. 24, 2015, which claims priority under 35 U.S.C. § 119 (a) to Japanese Patent Application No. 2014-039930 filed in Japan on Feb. 28, 2014, to Japanese Patent Application No. 2014-094638 filed in Japan on May 1, 2014, and to Japanese Patent Application No. 2014-156957 filed in Japan on Jul. 31, 2014. Each of the above applications is hereby expressly incorporated by reference, in its entirety, into the present application.

BACKGROUND OF THE INVENTION

1. Field of the Invention

The present invention relates to a functional polymer membrane and a method for producing the same.

2. Description of the Related Art

Regarding membranes having various functions as functional polymer membranes, known examples include an ion-exchange membrane, a reverse osmosis membrane, a forward osmosis membrane, and a gas separation membrane.

For example, an ion-exchange membrane is used for electrodeionization (EDI), continuous electrodeionization (CEDI), electrodialysis (ED), electrodialysis reversal (EDR), and reverse electrodialysis (RED).

Electrodeionization (EDI) is a water treatment process, by which ions are eliminated from an aqueous liquid by using a thin film and utilizing potential in order to achieve ion transport. Unlike other water purification technologies such as conventional ion exchange, electrodeionization can be used to produce ultrapure water without requiring the use of chemical agents such as acids or caustic soda. Electrodialysis (ED) and electrodialysis reversal (EDR) are electrochemical separation processes by which ions and the like are eliminated from water and other fluids.

When a functional polymer membrane (hereinafter, also simply referred to as "membrane") is used for EDI, CEDI, ED, EDR and the like, it is preferable that the membrane has low electrical resistance and a low coefficient of water permeability. On the other hand, a functional polymer membrane is subjected to stress during integration into a treatment apparatus. Also, the dimensions of a functional polymer membrane should not change significantly during a treatment. Therefore, a functional polymer membrane is required to have certain mechanical strength, and for example, a functional polymer membrane may be imparted with mechanical strength by using a support having a predetermined thickness. For example, JP2013-503038A describes an ion-exchange membrane for electrodialysis having a microporous membrane support having a thickness of more than about 20 μm and less than 155 μm.

SUMMARY OF THE INVENTION

In regard to functional polymer membranes, making the film thickness small in order to reduce the electrical resistance of the membrane to a low level may be considered. However, when the film thickness is made thin, there is a problem that the coefficient of water permeability is increased. Accordingly, in order to further enhance the performance of a functional polymer membrane, it is essential to decrease the electrical resistance of the membrane and to decrease the coefficient of water permeability. However, in a case in which a support is used to provide mechanical strength, the degree of technical difficulty rises greatly.

For this reason, the inventors of the present invention conducted an investigation on the possibility of considering the electrical resistance and the coefficient of water permeability of a membrane as a whole and generally decreasing the balance of these, that is, the possibility of lowering the ratio between the coefficient of water permeability and ion permeability, which is represented by the reciprocal of the electrical resistance of a membrane (coefficient of water permeability/ion permeability). Thereby, for example, it is expected to reduce the energy required for electrodialysis.

The ion-exchange membrane for electrodialysis described in JP2013-503038A is such that since the film thickness is small, the electrical resistance of the membrane is reduced to a low level; however, the coefficient of water permeability is high, and no attention is paid to the relationship between the electrical resistance and the coefficient of water permeability of the membrane.

Therefore, it is an object of the invention to develop means for lowering the coefficient of water permeability and the electrical resistance of a membrane as a whole, that is, lowering the ratio of coefficient of water permeability/ion permeability, and thereby providing a functional polymer membrane having excellent performance even as an ion-exchange membrane, and a method for producing the same.

The inventors conducted a thorough investigation, and as a result, the inventors found that when the elemental composition at the surface of a support included in a functional polymer membrane is defined to be in a predetermined range, even if the film thickness of the functional polymer membrane is made small, increase of the coefficient of water permeability can be suppressed. The invention was achieved based on these findings.

<1> A functional polymer membrane comprising: a porous support; and crosslinked polymer electrolyte, in which the film thickness of the functional polymer membrane is smaller than 100 μm, the crosslinked polymer electrolyte is a crosslinked polymer formed by subjecting a composition including a monomer having a (meth)acrylamide skeleton to a polymerization curing reaction, and the proportion of elemental oxygen in the elemental composition excluding elemental hydrogen and helium at the surface of the porous support is from 14.0 atom % to 25.0 atom %.

<2> The functional polymer membrane according to <1>, in which the proportion of elemental sulfur in the elemental composition excluding elemental hydrogen and helium at the surface of the porous support is from 0.1 atom % to 10.0 atom %.

<3> The functional polymer membrane according to <1> or <2>, in which the porosity of the porous support is from 55% to 85%.

<4> The functional polymer membrane according to any one of <1> to <3>, in which the porous support is a nonwoven fabric.

<5> The functional polymer membrane according to any one of <1> to <4>, in which the crosslinked polymer has a substituent or a linking group, both of which include at least an ammonium salt and/or a pyridinium salt.

<6> The functional polymer membrane according to any one of <1> to <5>, in which the functional polymer membrane is formed by the crosslinked polymer electrolyte being embedded in the pores of the porous support.

<7> The functional polymer membrane according to any one of <1> to <6>, in which the crosslinked polymer has a structure represented by the following Formula (I).

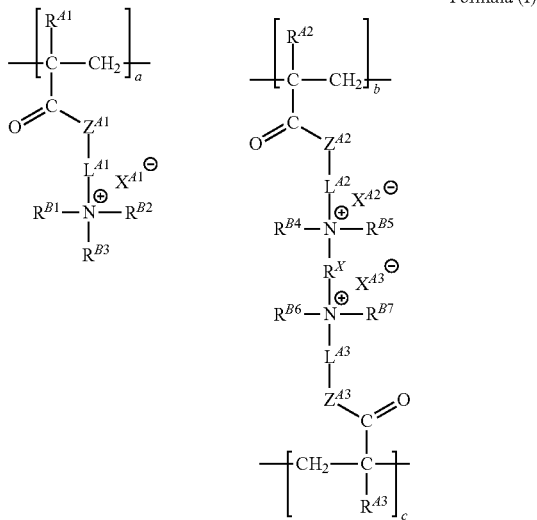

Formula (I)

In Formula (I), $R^{A1}$ to $R^{A3}$ each independently represent a hydrogen atom or an alkyl group; $R^{B1}$ to $R^{B7}$ each independently represent an alkyl group or an aryl group; $Z^{A1}$ to $Z^{A3}$ each independently represent —NRa—, where Ra represents a hydrogen atom or an alkyl group; $L^{A1}$ to $L^{A3}$ each independently represent an alkylene group; $R^X$ represents an alkylene group, an alkenylene group, an alkynylene group, an arylene group, —O—, or a divalent linking group combining these; $X^{A1}$ to $X^{A3}$ each independently represent a halogen ion or an aliphatic or aromatic carboxylic acid ion; a to c represent the molar ratios of the respective unit structures, and a represents 0 to 0.75, while b and c each independently represent 0.25 to 1.00.

<8> The functional polymer membrane according to any one of <1> to <7>, in which the contact angle of water with respect to the membrane surface of the functional polymer membrane is from 80° to 120°.

<9> The functional polymer membrane according to any one of <1> to <8>, in which the surface tension at 25° C. of the composition is from 15 mN/m to 27 mN/m.

<10> The functional polymer membrane according to any one of <1> to <9>, further comprising: a fluorine-based surfactant.

<11> A method for producing a functional polymer membrane containing a porous support and a crosslinked polymer electrolyte, the functional polymer membrane being a functional polymer membrane according to any one of <1> to <10>, the method comprising impregnating a porous support with a composition including a monomer having a (meth)acrylamide skeleton, and then subjecting the composition to a polymerization curing reaction through irradiation with ultraviolet radiation or/and heating.

According to the present specification, the "surface of a porous support" refers to the depth (about 5 nm) measured by X-ray photoelectron spectroscopy (XPS) using A1Kα radiation as an X-ray source, under the measurement conditions of a photoelectron take-off angle of 45° and a pass energy of 55 eV.

Furthermore, the proportion of the number of atoms of a predetermined atom, in a case in which the total number of atoms present at the surface of a porous support (excluding hydrogen and helium) is designated as 100 atom %, is indicated as atom %.

Furthermore, in regard to the "porosity" of a porous support, in a case in which, from the volume of a porous support, the total volume of the volume occupied by the material that constitutes the porous support and the volume occupied by space other than the material is designated as 100%, the porosity represents the proportion of the volume (percent (%) by volume) occupied by space. Meanwhile, the porosity can be determined by the calculation equation described below.

Also, "(a value) to (a value)" is used to mean that the values described before and after "to" are included as the lower limit and the upper limit.

According to the invention, the description of "(meth) acryl" or the like means —C(=O)CH=CH$_2$ and/or —C(=O)C(CH$_3$)=CH$_2$. For example, "(meth)acrylamide" represents acrylamide and/or methacrylamide, and "(meth) acrylate" represents acrylate and/or methacrylate.

However, in a case in which the description "monomer having a (meth)acrylamide skeleton" is given, it is intended that the relevant monomer also includes a monomer having an α-alkylacrylamide skeleton represented by —NR$^1$—C(=O)CR$^2$=CH$_2$ (where R$^1$ and R$^2$ each represent an alkyl group), in addition to an acrylamide and/or methacrylamide skeleton.

Furthermore, in each of the formulae, unless particularly stated otherwise, in a case in which there are plural groups represented by the same reference symbol, these may be identical to or different from each other. Similarly, in a case in which there are repetitions of plural partial structures, this is intended to mean both that these repetitions are identical repetitions, and that these repetitions are mixtures of different repetitions within a defined range.

Furthermore, in regard to geometric isomers, which represent substitution styles of double bonds in each of the formulae, for the convenience of indication, even if only one isomer is described, unless particularly stated otherwise, isomers may be an E-form or a Z-form, or may be a mixture thereof.

According to the invention, means capable of lowering the electrical resistance and the coefficient of water permeability of a membrane as a whole, that is, capable of lowering the ratio of the coefficient of water permeability/ion permeability, has been developed, and as a result, the energy required for electrodialysis or the like can be reduced. When this means is used, a functional polymer membrane having excellent performance as an ion-exchange membrane, and a method for producing the functional polymer membrane can be provided.

The above-described features and advantages as well as other features and advantages of the invention will be further disclosed from the descriptions given below, with appropriate reference to the attached drawings.

BRIEF DESCRIPTION OF THE DRAWINGS

FIG. 1 is a schematic diagram illustrating the flow channels of an apparatus for measuring the coefficient of water permeability of a membrane.

DESCRIPTION OF THE PREFERRED EMBODIMENTS

<<Functional Polymer Membrane>>

The functional polymer membrane of the invention can be used in order to perform ion exchange, reverse osmosis, forward osmosis, gas separation, and the like. In the following description, preferred embodiments of the invention will be explained by taking an example of a case in which the functional polymer membrane has a function as an ion-exchange membrane.

<Porous Support>

The functional polymer membrane of the invention has a porous support. When the curable composition for membrane formation that will be described below is caused to exist in the pores of this porous support, the porous support can be constructed as a part of the membrane. Examples of the porous support as a reinforcing material include a synthetic woven fabric, a nonwoven fabric such as a synthetic nonwoven fabric, a spongy film, and a film having fine thorough-holes. Examples of the material that forms the porous support according to the invention include polyethylene, polypropylene, polyacrylonitrile, polyvinyl chloride, polyester, polyamide, and copolymers thereof. Other examples include polysulfone, polyethersulfone, polyphenylene sulfone, polyphenylene sulfide, polyimide, polyetherimide, polyamide, polyamideimide, polyacrylonitrile, polycarbonate, polyacrylate, cellulose acetate, polypropylene, poly(4-methyl-1-pentene), polyvinylidene fluoride, polytetrafluoroethylene, polyhexafluoropropylene, polychlorotrifluoroethylene, and copolymers thereof. Commercially available porous supports and reinforcing materials are commercially available from, for example, Mitsubishi Paper Mills, Ltd., Nippon Kodoshi Corporation, Asahi Kasei Fibers Corporation, Japan Vilene Company, Ltd., Tapyrus Co., Ltd., and Freudenberg Filtration Technologies KG.

The porous support according to the invention is preferably a nonwoven fabric, and among nonwoven fabrics, a nonwoven fabric formed from composite fibers of polyethylene and polypropylene is preferred. Also, the fiber length of these composite fibers is preferably 0.5 µm to 15 µm, more preferably 1 µm to 13 µm, and particularly preferably 2 µm to 10 µm. The thickness of the porous support according to the invention is preferably 20 µm to 90 µm, more preferably 30 µm to 80 µm, and particularly preferably 40 µm to 70 µm.

<Film Thickness of Functional Polymer Membrane>

The film thickness of the functional polymer membrane of the invention is the film thickness as a composite including a porous support and a crosslinked polymer electrolyte.

The film thickness of the functional polymer membrane of the invention is specifically the film thickness of a functional polymer membrane that has been stored for at least 12 hours in a 0.1 M NaCl solution, as disclosed in the Examples.

In this invention, the film thickness of the functional polymer membrane is smaller than 100 µm, preferably 10 µm to 90 µm, more preferably 30 µm to 80 µm, and particularly preferably 40 µM to 80 µm.

When the film thickness is within this range, the electrical resistance of the membrane can be reduced to a low level.

<Elemental Composition at Surface of Porous Support>

In regard to the porous support included in the functional polymer membrane of the invention, a porous support in which the proportion of elemental oxygen with respect to the elemental composition excluding elemental hydrogen and helium at the surface of the porous support is 14.0 atom % to 25.0 atom %, is used, and this porous support is compositized with a crosslinked polymer electrolyte.

The proportion of elemental oxygen is 14.0 atom % to 25.0 atom %, more preferably 16.0 atom % to 24.0 atom %, and particularly preferably 18.0 atom % to 23.0 atom %.

Furthermore, the proportion of elemental sulfur is preferably 0.1 atom % to 10.0 atom %, more preferably 1.0 atom % to 8.5 atom %, and particularly preferably 2.5 atom % to 7.5 atom %.

Here, the atomic percent (%) of elemental oxygen or elemental sulfur is the atomic percent of elemental oxygen or elemental sulfur among the atoms of all the elements excluding elemental hydrogen and elemental helium.

Meanwhile, the elemental hydrogen and helium are excluded because, as will be described below, these elements cannot be analyzed by X-ray photoelectron spectroscopy.

That is, when the elemental composition is within the range described above, with regard to the functional polymer membrane of the invention, even if the film thickness is small, the coefficient of water permeability can be reduced to a low level. The reason for this is not clearly understood; however, the following may be considered.

It is speculated to be because, when the abundance of elemental oxygen or elemental sulfur at the surface of the porous support increases, the interaction between the porous support and the crosslinked polymer electrolyte is increased, and the leakage of water through the interface between the porous support and the crosslinked polymer electrolyte as the permeation pathway can be suppressed.

[Gas Treatment]

According to the invention, adjustment of the elemental composition at the surface of the porous support can be carried out by, for example, subjecting the surface of the porous support to a gas treatment.

According to the invention, a gas treatment of bringing a porous support into contact with an oxygen-containing compound gas, a sulfur-containing compound gas, or a mixed gas including an oxygen-containing compound gas and a sulfur-containing compound gas (hereinafter, referred to as "oxygen/sulfur-containing compound gas or the like"), together with fluorine gas, is preferred. Thereby, an oxygen functional group or a sulfur functional group can be introduced into the surface of the porous support, and when a predetermined amount of sulfur atoms and the like are introduced, the elemental composition of the porous support surface can be adjusted.

Specific examples of the oxygen/sulfur-containing compound gas or the like include sulfur monoxide gas and sulfur dioxide gas. Specific examples of the oxygen-containing compound gas include oxygen gas, carbon monoxide gas, and carbon dioxide gas.

Meanwhile, before a fluorine gas treatment is applied, for example, the surface of the porous support may be modified by, for example, a corona discharge treatment, a plasma treatment, a glow discharge treatment, or an electron beam treatment, and subsequently, a fluorine gas treatment may be applied to the surface.

Meanwhile, the method for bringing a porous support into contact with an oxygen/sulfur-containing compound gas or the like is not particularly limited. For example, when the two materials are brought into contact for 10 seconds to 600 seconds at a temperature of 10° C. to 50° C. in a sealed space, a porous support having a predetermined surface elemental composition can be obtained.

[Method for Analyzing Elemental Composition at Surface of Porous Support]

According to the invention, the elemental composition at the surface of the porous support can be analyzed by X-ray photoelectron spectroscopy (XPS). The X-ray photoelectron spectroscopy is carried out using an X-ray photoelectron spectroscopic apparatus (for example, trade name: QUANTERA SMX, manufactured by Ulvac-PHI, Inc.).

<Porosity>

In regard to the "porosity" of the porous support, in a case in which, from the volume of a porous support, the total volume of the volume occupied by the material that constitutes the porous support and the volume occupied by space other than the material, such as pores, is designated as 100%, the porosity represents the proportion of the volume (percent (%) by volume) occupied by space.

The porosity can be calculated by the following formula, from the mass per unit area [g/m$^2$] and the thickness [cm] of the porous support, and the density [g/cm$^3$] of the material that constitutes the porous support.

Porosity(%)=100−(mass per unit area [g/m$^2$] of porous support/(10,000×density [g/cm$^3$] of material constituting porous support×thickness [cm] of porous support))

The porosity of the porous support used for the invention is preferably from 55% to 85%, more preferably from 60% to 80%, and particularly preferably from 63% to 75%.

<Crosslinked Polymer Electrolyte>

The functional polymer membrane of the invention contains a crosslinked polymer electrolyte.

The crosslinked polymer electrolyte according to the invention is a crosslinked polymer formed by polymerizing a composition which includes a monomer having a (meth)acrylamide skeleton, and the functional polymer membrane of the invention preferably has a structure represented by the following Formula (I).

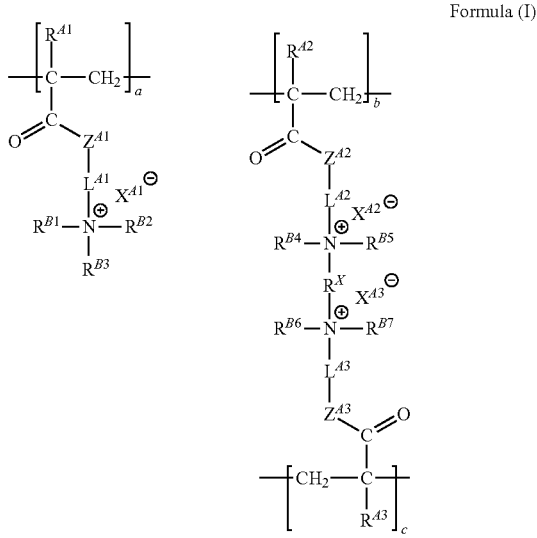

Formula (I)

In Formula (I), $R^{A1}$ to $R^{A3}$ each independently represent a hydrogen atom or an alkyl group; $R^{B1}$ to $R^{B7}$ each independently represent an alkyl group or an aryl group; $Z^{A1}$ to $Z^{A3}$ each independently represent —NRa-, where Ra represents a hydrogen atom or an alkyl group; $L^{A1}$ to $L^{A3}$ each independently represent an alkylene group; $R^X$ represents an alkylene group, an alkenylene group, an alkynylene group, an arylene group, —O—, or a divalent linking group combining these; $X^{A1}$ to $X^{A3}$ each independently represent a halogen ion or an aliphatic or aromatic carboxylic acid ion; a to c represent the molar ratios of the respective unit structures, and a represents 0 to 0.75, while b and c each independently represent 0.25 to 1.00.

Here, the unit structure represented by the molar ratio a may be bonded to the unit structure represented by the molar ratio b, may be bonded to the unit structure represented by the molar ratio c, or may be bonded to both the unit structure represented by the molar ratio b and the unit structure represented by the molar ratio c. Furthermore, if the structure includes the unit structure represented by the molar ratio a, the structure may also include a structure in which the unit structure represented by the molar ratio b and the unit structure represented by the molar ratio c are bonded.

The alkyl group for $R^{A1}$ to $R^{A3}$ and Ra is a linear or branched alkyl group, which preferably has 1 to 12 carbon atoms, more preferably 1 to 8 carbon atoms, even more preferably 1 to 4 carbon atoms, and particularly preferably one carbon atom.

Among them, $R^{A1}$ to $R^{A3}$ are each preferably a hydrogen atom or a methyl group, and a hydrogen atom is most preferred.

Between a hydrogen atom and an alkyl group, Ra is preferably a hydrogen atom.

The alkyl group for $R^{A1}$ to $R^{A3}$ may have a substituent, and examples of the substituent include any arbitrary substituents selected from the Substituent Group α that will be described below.

The alkyl group for $R^{B1}$ to $R^{B7}$ is a linear or branched alkyl group, which preferably has 1 to 9 carbon atoms, more preferably 1 to 8 carbon atoms, even more preferably 1 to 4 carbon atoms, and particularly preferably one carbon atom.

The aryl group for $R^{B1}$ to $R^{B7}$ preferably has 6 to 12 carbon atoms, more preferably 6 to 9 carbon atoms, and particularly preferably 6 carbon atoms.

Above all, an alkyl group is preferred for $R^{B1}$ to $R^{B7}$.

The alkyl group and aryl group for $R^{B1}$ to $R^{B7}$ may have a substituent, and examples of the substituent include arbitrary substituents selected from the Substituent Group α that will be described below.

The substituted alkyl group is preferably a benzyl group.

The alkylene group for $L^{A1}$ to $L^{A3}$ is a linear or branched alkylene group, which preferably has 1 to 9 carbon atoms, more preferably 2 to 8 carbon atoms, even more preferably 2 to 6 carbon atoms, and particularly preferably 2 or 3 carbon atoms.

The alkylene group for $L^{A1}$ to $L^{A3}$ may have a substituent, and examples of the substituent include arbitrary substituents selected from the Substituent Group α that will be described below. Among the substituents which an alkylene group may have, a hydroxy group is particularly preferred.

$R^X$ represents an alkylene group, an alkenylene group, an alkynylene group, an arylene group, —O—, or a divalent linking group combining these.

The alkylene group represents a linear or branched alkylene group, which preferably has 1 to 9 carbon atoms, and the alkenylene group or the alkynylene group represents a linear or branched alkenylene group or alkynylene group, which preferably has 2 to 9 carbon atoms.

The arylene group preferably has 6 to 12 carbon atoms, more preferably 6 to 8 carbon atoms, and even more preferably 6 carbon atoms.

The divalent linking group combining an alkylene group, an alkenylene group, an alkynylene group, an arylene group, or —O— is preferably a linking group combining two to four of these groups. Examples of a combination of two groups include a combination of an alkylene group and —O—, a combination of an alkylene group and an arylene group, and a combination of an arylene group and an arylene group.

Each of the groups for $R^X$ may each have a substituent, and examples of the substituent include arbitrary substituents selected from the Substituent Group α that will be described below.

Regarding a group combining these groups, -alkylene-phenylene-alkylene- is preferred.

Examples of the halogen ion for $X^{41}$ to $X^{43}$ include chlorine ion, bromine ion, and iodine ion.

Examples of the aliphatic or aromatic carboxylic acid ion for $X^{41}$ to $X^{43}$ include formate ion, acetate ion, propionate ion, butanoate ion, and benzoate ion.

The aliphatic or aromatic carboxylic acid ion for $X^{41}$ to $X^{43}$ is preferably an aliphatic carboxylic acid ion, and acetate ion is more preferred.

$X^{41}$ to $X^{43}$ are each preferably chlorine ion, bromine ion, iodine ion, or acetate ion.

a represents 0 to 0.75, preferably 0.01 to 0.67, and more preferably 0.01 to 0.5.

b and c each independently represent 0.25 to 1.00, preferably 0.33 to 0.99, and more preferably 0.5 to 0.99.

Furthermore, the structure represented by Formula (I) may include other constitutional units in addition to the unit as a structural unit of a, and the unit as a structural unit of b.

Here, Substituent Group α will be explained

The Substituent Group α is a group of substituents composed of the following substituents.

(Substituent Group α)

An alkyl group (preferably an alkyl group having 1 to 30 carbon atoms, more preferably 1 to 20 carbon atoms, and particularly preferably 1 to 10 carbon atoms, and examples thereof include methyl, ethyl, isopropyl, t-butyl, n-octyl, 2-ethylhexyl, n-decyl, and n-hexadecyl), a cycloalkyl group (preferably a cycloalkyl group having 3 to 30 carbon atoms, more preferably 3 to 20 carbon atoms, and particularly preferably 3 to 10 carbon atoms, and examples thereof include cyclopropyl, cyclopentyl, and cyclohexyl), an alkenyl group (preferably an alkenyl group having 2 to 30 carbon atoms, more preferably 2 to 20 carbon atoms, and particularly preferably 2 to 10 carbon atoms, and examples thereof include vinyl, allyl, 2-butenyl, and 3-pentenyl), an alkynyl group (preferably an alkynyl group having 2 to 30 carbon atoms, more preferably 2 to 20 carbon atoms, and particularly preferably 2 to 10 carbon atoms, and examples thereof include propargyl and 3-pentynyl), an aryl group (preferably an aryl group having 6 to 30 carbon atoms, more preferably 6 to 20 carbon atoms, and particularly preferably 6 to 12 carbon atoms, and examples thereof include phenyl, p-methylphenyl, naphthyl, and anthranyl), an amino group (including an amino group, an alkylamino group, and an arylamino group; the amino group is preferably an amino group having 0 to 30 carbon atoms, more preferably 0 to 20 carbon atoms, and particularly preferably 0 to 10 carbon atoms, and examples thereof include amino, methylamino, dimethylamino, diethylamino, dibenzylamino, diphenylamino, and ditolylamino), an alkoxy group (preferably an alkoxy group having 1 to 30 carbon atoms, more preferably 1 to 20 carbon atoms, and particularly preferably 1 to 10 carbon atoms, and examples thereof include methoxy, ethoxy, butoxy, and 2-ethylhexyloxy), an aryloxy group (preferably an aryloxy group having 6 to 30 carbon atoms, more preferably 6 to 20 carbon atoms, and particularly preferably 6 to 12 carbon atoms, and examples thereof include phenyloxy, 1-naphthyloxy, and 2-naphthyloxy), a heterocyclic oxy group (preferably a heterocyclic oxy group having 2 to 30 carbon atoms, more preferably 2 to 20 carbon atoms, and particularly preferably 2 to 12 carbon atoms, and examples thereof include pyridyloxy, pyrazyloxy, pyrimidyloxy, and quinolyloxy), an acyl group (preferably an acyl group having 1 to 30 carbon atoms, more preferably 1 to 20 carbon atoms, and particularly preferably 1 to 12 carbon atoms, and examples thereof include acetyl, benzoyl, formyl, and pivaloyl), an alkoxycarbonyl group (preferably an alkoxycarbonyl group having 2 to 30 carbon atoms, more preferably 2 to 20 carbon atoms, and particularly preferably 2 to 12 carbon atoms, and examples thereof include methoxycarbonyl and ethoxycarbonyl), an aryloxycarbonyl group (preferably an aryloxycarbonyl group having 7 to 30 carbon atoms, more preferably 7 to 20 carbon atoms, and particularly preferably 7 to 12 carbon atoms, and examples thereof include phenyloxycarbonyl), an acyloxy group (preferably an acyloxy group having 2 to 30 carbon atoms, more preferably 2 to 20 carbon atoms, and particularly 2 to 10 carbon atoms, and examples thereof include acetoxy and benzoyloxy), an acylamino group (preferably an acylamino group having 2 to 30 carbon atoms, more preferably 2 to 20 carbon atoms, and particularly preferably 2 to 10 carbon atoms, and examples thereof include acetylamino and benzoylamino), an alkoxycarbonylamino group (preferably an alkoxycarbonylamino group having 2 to 30 carbon atoms, more preferably 2 to 20 carbon atoms, and particularly preferably 2 to 12 carbon atoms, and examples thereof include methoxycarbonylamino), an aryloxycarbonylamino group (preferably an aryloxycarbonylamino group having 7 to 30 carbon atoms, more preferably 7 to 20 carbon atoms, and particularly preferably 7 to 12 carbon atoms, and examples thereof include phenyloxycarbonylamino), an alkyl- or arylsulfonylamino group (preferably having 1 to 30 carbon atoms, more preferably 1 to 20 carbon atoms, and particularly preferably 1 to 12 carbon atoms, and examples thereof include methanesulfonylamino and benzenesulfonylamino), a sulfamoyl group (including a sulfamoyl group, and an alkyl- or arylsulfamoyl group; preferably a sulfamoyl group having 0 to 30 carbon atoms, more preferably 0 to 20 carbon atoms, and particularly preferably 0 to 12 carbon atoms, and examples thereof include sulfamoyl, methylsulfamoyl, dimethylsulfamoyl, and phenylsulfamoyl), a carbamoyl group (including a carbamoyl group and an alkyl- or arylcarbamoyl group; preferably a carbamoyl group having 1 to 30 carbon atoms, more preferably 1 to 20 carbon atoms, and particularly preferably 1 to 12 carbon atoms, and examples thereof include carbamoyl, methylcarbamoyl, diethylcarbamoyl, and phenylcarbamoyl), an alkylthio group (preferably an alkylthio group having 1 to 30 carbon atoms, more preferably 1 to 20 carbon atoms, and particularly preferably 1 to 12 carbon atoms, and examples thereof include methylthio and ethylthio), an arylthio group (preferably an arylthio group having 6 to 30 carbon atoms, more preferably 6 to 20 carbon atoms, and particularly preferably 6 to 12 carbon atoms, and examples thereof include phenylthio), a heterocyclic thio group (preferably a heterocyclic thio group having 2 to 30 carbon atoms, more preferably 2 to 20 carbon atoms, and particularly preferably 2 to 12 carbon atoms, and examples thereof include pyridylthio, 2-benzimidazolylthio, 2-benzoxazolylthio, and 2-benzothiazolylthio), an alkyl- or arylsulfonyl group (preferably an alkyl- or arylsulfonyl group having 1 to 30 carbon atoms, more preferably 1 to 20 carbon atoms, and particularly preferably 1 to 12 carbon atoms, and examples thereof include mesyl and tosyl), an alkyl- or arylsulfinyl group (preferably an alkyl- or arylsulfinyl group having 1 to 30 carbon atoms, more preferably 1 to 20 carbon atoms, and particularly preferably 1 to 12 carbon atoms, and examples thereof include methanesulfinyl and benzenesulfinyl), a ureido group (preferably a ureido group having 1 to 30 carbon atoms, more preferably 1 to 20 carbon atoms, and particularly preferably 1 to 12 carbon atoms, and examples thereof include ureido, methylureido, and phenylureido), a phosphoric acid amide group (preferably a phosphoric acid amide group having 1 to 30 carbon atoms, more preferably 1 to 20 carbon atoms, and particularly preferably 1 to 12 carbon atoms, and examples thereof include diethylphosphoric acid amide and phenylphosphoric acid amide), a hydroxy group, a mercapto group, a halogen atom (examples thereof include a fluorine atom, a chlorine atom, a bromine atom, and an iodine atom, and more preferred is a fluorine atom), a cyano group, a sulfo group, a carboxyl group, an oxo group, a nitro group, a hydroxamic acid group, a sulfino group, a hydrazino group, an imino group, a heterocyclic group (preferably a heterocyclic group having 1 to 30 carbon atoms, and more preferably 1 to 12 carbon atoms; preferred examples of the ring-constituting heteroatom include a nitrogen atom, an oxygen atom, and a sulfur atom, and specific examples thereof include imidazolyl, pyridyl, quinolyl, furyl, thienyl, piperidyl, morpholino, benzoxazolyl, benzimidazolyl, benzothiazolyl, a carbazolyl group, and an azepinyl group), a silyl group (preferably a silyl group having 3 to 40 carbon atoms, more preferably 3 to 30 carbon atoms, and particularly preferably 3 to 24 carbon atoms, and examples thereof include trimethylsilyl and triphenylsilyl), and a silyloxy group (preferably a silyloxy group having 3 to 40 carbon atoms, more preferably 3 to 30 carbon atoms, and particularly preferably 3 to 24 carbon atoms, and examples thereof include trimethylsilyloxy and triphenylsilyloxy).

These substituents may be further substituted with any one or more substituents selected from the Substituent Group α described above.

Meanwhile, according to the invention, when there are plural substituents at one structural site, those substituents may be linked to each other and form a ring, or those substituents may be condensed with a portion or the entirety of the structural site and form an aromatic ring or an unsaturated heterocyclic ring.

<Ion Exchange Capacity>

The ion exchange capacity of the functional polymer membrane of the invention is preferably 2.0 meq/g to 7.0 meq/g, more preferably 2.5 meq/g to 7.0 meq/g, and even more preferably 3.0 meq/g to 7.0 meq/g, based on the total dry mass of this functional polymer membrane. Here, the unit meq is milliequivalent.

The ion exchange capacity can be measured by the method described in NAKAGAKI, Masayuki, ed., Maku-gaku Jikken-ho (Membranology Experimental Methods), p. 194, Kitami Shobo (1984) (ISBN-978-4-906126-09-5).

<Coefficient of Water Permeability>

The coefficient of water permeability of the functional polymer membrane of the invention is preferably $15 \times 10^{-5}$ ml/m$^2$/Pa/hr or less, more preferably $12 \times 10^{-5}$ ml/m$^2$/Pa/hr or less, and even more preferably $9 \times 10^{-5}$ ml/m$^2$/Pa/hr or less. The lower limit of the coefficient of water permeability is not particularly limited. Meanwhile, a coefficient of water permeability of $1 \times 10^{-5}$ ml/m$^2$/Pa/hr or more is practical.

<Electrical Resistance of Membrane>

The electrical resistance (membrane resistance) of the functional polymer membrane of the invention is preferably less than 2.8 Ω·cm$^2$, more preferably less than 2.0 Ω·cm$^2$, and even more preferably less than 1.5 Ω·cm$^2$. A lower membrane resistance is more preferable, and it is preferable that the membrane resistance is adjusted to have the lowest value in the range that can be realized, in order to provide the effects of the invention. The lower limit of the membrane resistance is not particularly limited. Meanwhile, a membrane resistance of 0.3 Ω·cm$^2$ or more is practical.

<Ratio of Coefficient of Water Permeability and Ion Permeability (Coefficient of Water Permeability/Ion Permeability)>

It is preferable that the functional polymer membrane of the invention has high ion permeability that is represented by 1/membrane resistance, and a low coefficient of water permeability.

Meanwhile, ion permeability is preferably 0.2 S/cm$^2$ or more, more preferably 0.4 S/cm$^2$ or more, and even more preferably 0.76 S/cm$^2$ or more. The upper limit of ion permeability is not particularly limited. Meanwhile, an ion permeability of 3.3 S/cm$^2$ or less is practical.

In this invention, neither the ion permeability nor the coefficient of water permeability is dealt with alone, and a balance is achieved between the increase in the ion permeability and the decrease in the coefficient of water permeability, as a practical measure. Therefore, a comparison of the ratio between the coefficient of water permeability (ml/m$^2$/Pa/hr) and the ion permeability (S/cm$^2$) (coefficient of water permeability/ion permeability) is effective as an evaluation standard.

A smaller value of the ratio of coefficient of water permeability/ion permeability is more preferable, and the value is preferably $13 \times 10^{-5}$ (ml/m$^2$/Pa/hr/S·cm$^2$) or less, and more preferably $11 \times 10^{-5}$ (ml/m$^2$/Pa/hr/S·cm$^2$) or less.

<Method for Measuring Electrical Resistance, Selective Permeability, and Swelling Ratio in Water of Membrane>

The electrical resistance, selective permeability, and swelling ratio (%) in water of a membrane can be measured by, for example, the method described in Membrane Science, 319, 217-218 (2008), written by NAKAGAKI, Masayuki, Maku-gaku Jikken-ho (Membranology Experimental Methods), pp. 193-195 (1984).

<Selective Permeability>

It is preferable that the functional polymer membrane of the invention is an anion-exchange membrane.

The selective permeability for anions such as Cl$^-$ of the functional polymer membrane (anion-exchange membrane) of the invention is preferably more than 0.90, more preferably more than 0.93, and even more preferably more than 0.95, and it is more preferable as the selective permeability value is closer to the theoretical value, 1.0.

<Swelling Ratio>

The swelling ratio (dimensional change ratio caused by swelling) of the functional polymer membrane of the invention in water is preferably less than 30%, more preferably less than 15%, and even more preferably less than 8%. The swelling ratio can be controlled by selecting appropriate parameters in the polymerization curing stage.

<<Method for Producing Functional Polymer Membrane>>

It is preferable that the functional polymer membrane of the invention is produced by subjecting a composition including a polymerizable compound represented by the following Formula (A) (polyfunctional polymerizable compound) and a monofunctional polymerizable compound represented by the following Formula (B) as monomers having a (meth)acrylamide skeleton, a monofunctional polymerizable compound other than the monofunctional polymerizable compound represented by Formula (B), a polymerization initiator, a polymerization inhibitor, a solvent and the like, to a polymerization curing reaction by irradiating the composition with ultraviolet radiation. That is, when polymerization is performed by irradiating a composition including these components with ultraviolet radiation, the composition undergoes a polymerization curing reaction, and a membrane is formed.

In the following description, each of the components of the composition for forming the functional polymer membrane of the invention (hereinafter, also referred to as curable composition) will be explained. Meanwhile, as will be described below, a curable composition is used by impregnating a porous support with the curable composition, and the curable composition means a composition that substantially forms a crosslinked polymer electrolyte.

<Polyfunctional Polymerizable Compound>

The polyfunctional polymerizable compound used for the invention is a polymerizable compound represented by the following Formula (A).

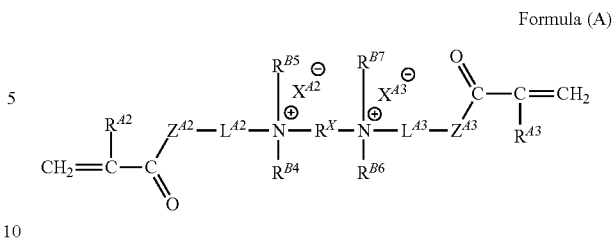

Formula (A)

In Formula (A), $R^{A2}$ and $R^{A3}$ each independently represent a hydrogen atom or an alkyl group; $R^{B4}$ to $R^{B7}$ each independently represent an alkyl group or an aryl group; $Z^{A2}$ and $Z^{A3}$ each independently represent —NRa—, where Ra represents a hydrogen atom or an alkyl group; $L^{A2}$ and $L^{A3}$ each independently represent an alkylene group; $R^X$ represents an alkylene group, an alkenylene group, an alkynylene group, an arylene group, —O—, or a divalent linking group combining these; and $X^{A2}$ and $X^{A3}$ each independently represent a halogen ion or an aliphatic or aromatic carboxylic acid ion.

Here, $R^{A2}$, $R^{A3}$, $R^{B4}$ to $R^{B7}$, $Z^{A2}$, $Z^{A3}$, $L^{A2}$, $L^{A3}$, $R^X$, $X^{A2}$, and $X^{A3}$ have the same meanings as corresponding $R^{A2}$, $R^{A3}$, $R^{B4}$ to $R^{B7}$, $Z^{A2}$, $Z^{A3}$, $L^{A2}$, $L^{A3}$, $R^X$, $X^{A2}$, and $X^{A3}$ in Formula (I), respectively, and preferred ranges thereof are also the same.

Specific examples of the polymerizable compound represented by Formula (A) will be listed below; however, the invention is not intended to be limited to these.

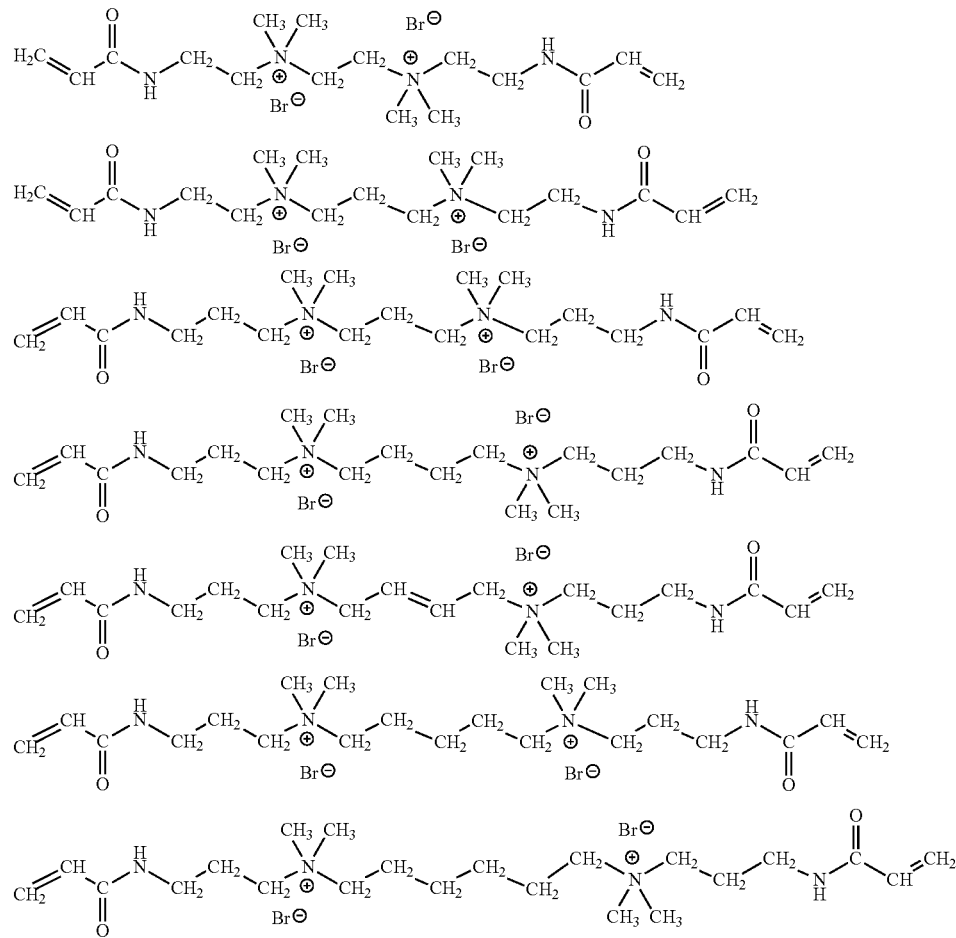

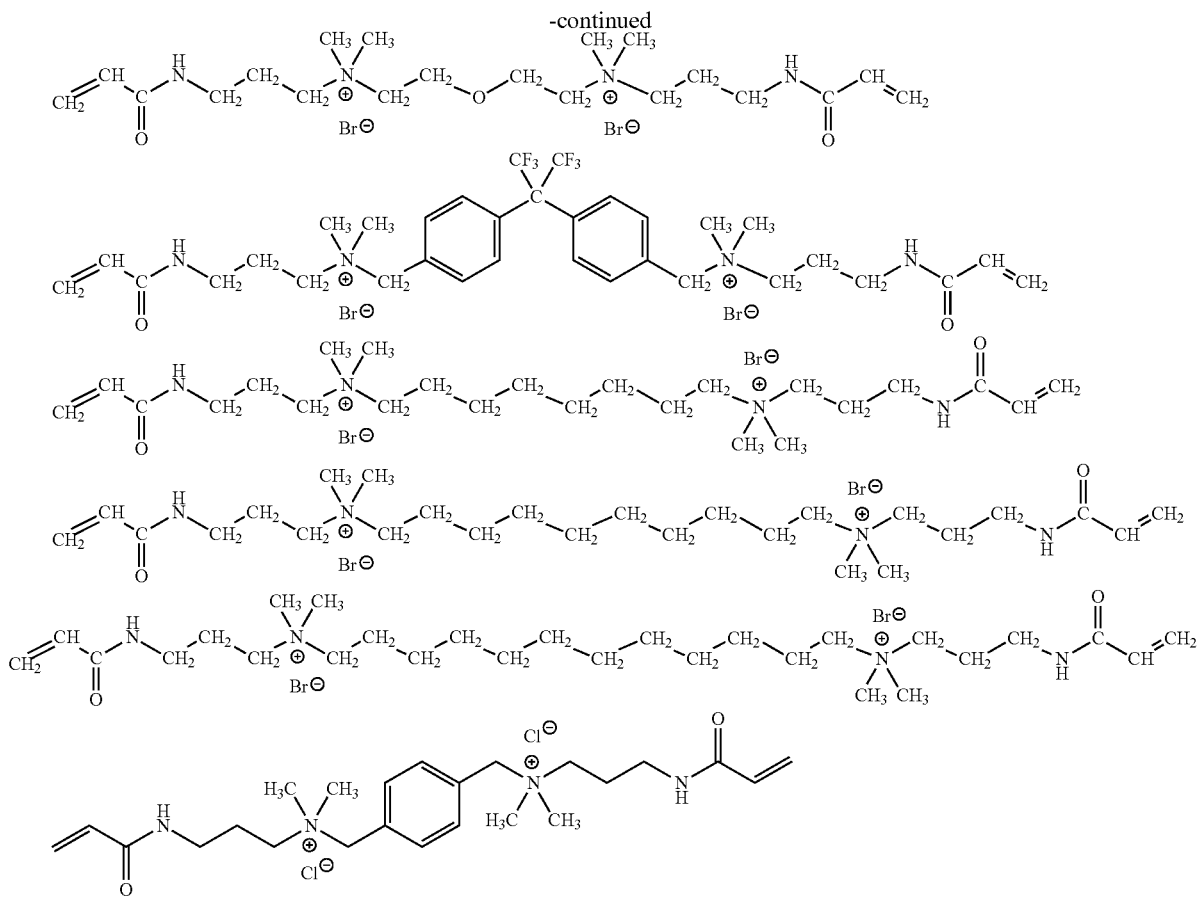

The polymerizable compound represented by Formula (A) is obtained by reacting a compound represented by the following Formula (A-1) with a compound represented by the following Formula (A-2).

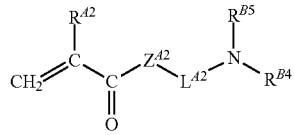

Formula (A-1)

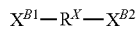

Formula (A-2)

In Formula (A-1), $R^{A2}$, $R^{B4}$, $R^{B5}$, $Z^{A2}$ and $L^{A2}$ have the same meanings as corresponding $R^{A2}$, $R^{B4}$, $R^{B5}$, $Z^{A2}$, and $L^{A2}$ in Formula (I), respectively, and preferred ranges thereof are also the same.

In Formula (A-2), $R^X$ has the same meaning as $R^X$ in Formula (I), and a preferred range thereof is also the same. $X^{B1}$ and $X^{B2}$ each independently represent a halogen atom or an aliphatic or aromatic acyloxy group.

Here, $X^{B1}$ and $X^{B2}$ react with the polymerizable compound represented by Formula (A-1) and are thereby released as anions, and finally become $X^{A2}$ and $X^{A3}$ in Formula (A).

<Monofunctional Polymerizable Compound>

A monofunctional polymerizable compound is used as a monofunctional polymerizable compound represented by the following Formula (B), which is a raw material used when a crosslinked polymer having a structure represented by Formula (I) is synthesized. In addition to this, a monofunctional polymerizable compound is used as a monofunctional polymerizable compound other than the monofunctional polymerizable compound represented by Formula (B), intended for obtaining a unit structure of a third copolymerization component according to necessity.

According to the invention, particularly in order to obtain a functional polymer membrane by imparting a function to a polymer membrane, it is preferable that the monofunctional polymerizable compound has a polar substituent such as a dissociable group, an anionic group, or a cationic group in a partial structure or in a substituent, and among them, the cationic group is preferably an onio group (an ammonio group, a pyridinio group, a sulfonio group, or the like).

Therefore, the monofunctional polymerizable compound represented by Formula (B) has an ammonio group.

—Monofunctional Polymerizable Compound Represented by Formula (B)—

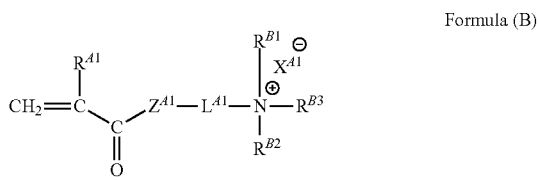

Formula (B)

In Formula (B), $R^{A1}$ represents a hydrogen atom or an alkyl group; $R^{B1}$ to $R^{B3}$ each independently represent an alkyl group or an aryl group; $Z^{41}$ represents —NRa—, where Ra represents a hydrogen atom or an alkyl group; $L^{41}$ represents an alkylene group; and $X^{41}$ represents a halogen ion or an aliphatic or aromatic carboxylic acid ion.

Here, $R^{41}$, $R^{B1}$ to $R^{B3}$, $Z^{41}$, $L^{41}$, and $X^{41}$ have the same meanings as corresponding $R^{41}$, $R^{B1}$ to $R^{B3}$, $Z^{41}$, and $L^{41}$, and $X^{41}$ in Formula (I), respectively, and preferred ranges thereof are also the same.

Specific examples of the monofunctional polymerizable compound represented by Formula (B) will be listed below; however, the invention is not intended to be limited to these.

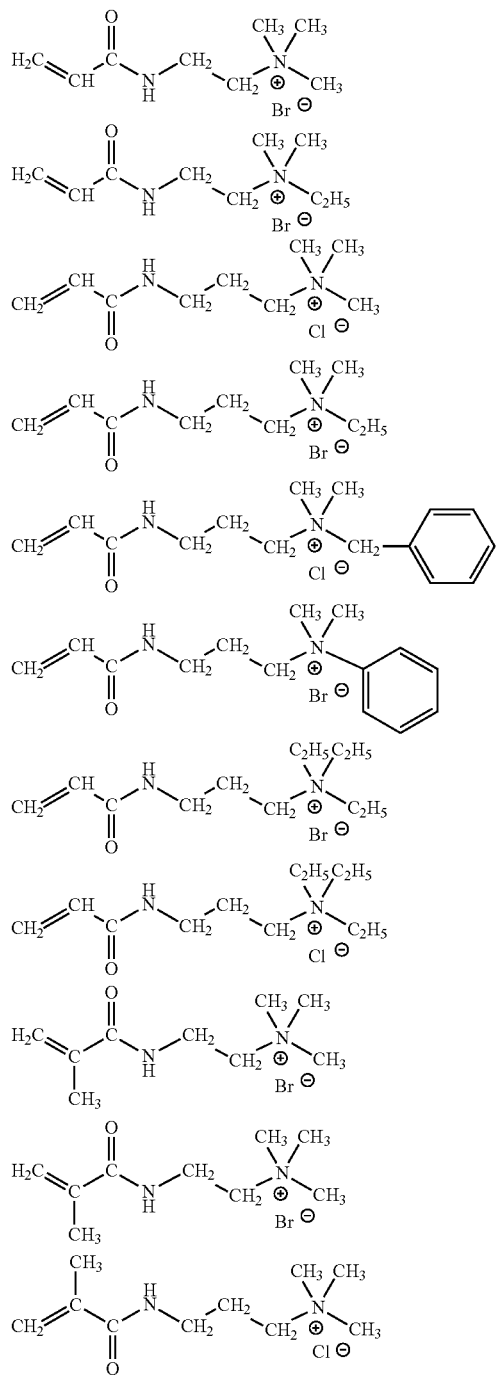

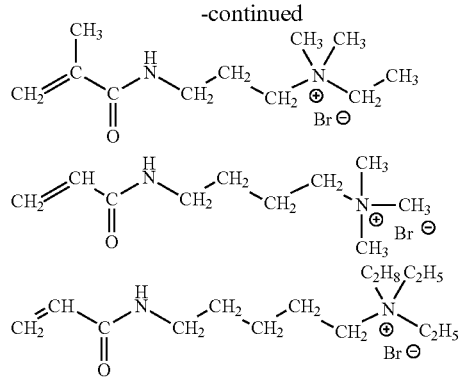

In 100 mol % of the total amount of the polymerizable compound represented by Formula (A) and the monofunctional polymerizable compound represented by Formula (B), the proportion of the molar content of the polymerizable compound represented by Formula (A) is preferably 25 mol % to 100 mol %, more preferably 33 mol % to 100 mol %, and even more preferably 50 mol % to 100 mol %.

Furthermore, the content of the polymerizable compound represented by Formula (A) in 100% by mass of the total solid content mass of the curable composition used for the invention is preferably 30% by mass to 100% by mass, more preferably 40% by mass to 99.8% by mass, and even more preferably 50% by mass to 99.6% by mass.

When the content is within the preferred range described above, desirable curability is obtained, and the curable composition acquires excellent pH resistance, mechanical strength, and flexibility.

—Other Monofunctional Polymerizable Compound—

The curable composition used for the invention may have a third monofunctional polymerizable compound in addition to the polymerizable compound represented by Formula (A) and the monofunctional polymerizable compound represented by Formula (B).

Examples of the monofunctional polymerizable compound other than the monofunctional polymerizable compound represented by Formula (B) include a (meth)acrylate compound, a (meth)acrylamide compound which does not have —N$^+$($R^{B1}$)($R^{B2}$)($R^{B3}$)($X^{41-}$), a vinyl ether compound, an aromatic vinyl compound, an N-vinyl compound (a polymerizable monomer having an amide bond), and an allyl compound.

Among these, from the viewpoints of the stability and pH resistance of the functional polymer membrane thus obtainable, a compound which does not have an ester bond, a (meth)acrylamide compound which does not have —N$^+$($R^{B1}$)($R^{B2}$)($R^{B3}$)($X^{41-}$), a vinyl ether compound, an aromatic vinyl compound, an N-vinyl compound (a polymerizable monomer having an amide bond), and an allyl compound are preferred, and a (meth)acrylamide compound which does not have —N$^+$($R^{B1}$)($R^{B2}$)($R^{B3}$)($X^{41-}$) is particularly preferred.

Meanwhile, $R^{B1}$, $R^{B2}$, $R^{B3}$, and $X^{41-}$ have the same meanings as corresponding $R^{B1}$, $R^{B2}$, $R^{B3}$, and $X^{41-}$ in Formula (B), and preferred ranges thereof are also the same.

Examples of the monofunctional polymerizable compound include the compounds described in JP2008-208190A and JP2008-266561A.

It is preferable that these monofunctional polymerizable compounds have dissociable groups as will be described below, from the viewpoint of imparting a function to the polymer membrane.

For example, it is preferable that a (meth)acrylate compound has a substituent (preferred substituents include the substituents described below) in the alcohol moiety of the ester, particularly a dissociable group in the alkyl moiety of the alcohol.

The other monofunctional polymerizable compound is preferably a compound represented by the following Formula (C).

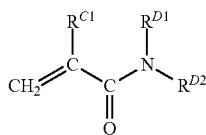

Formula (C)

In Formula (C), $R^{C1}$ represents a hydrogen atom or a methyl group; $R^{D1}$ represents a hydrogen atom or an alkyl group; and $R^{D2}$ represents an alkyl group, where $R^{D1}$ and $R^{D2}$ may be bonded to each other and form a ring.

$R^{C1}$ is preferably a hydrogen atom.

The alkyl group for $R^{D1}$ and $R^{D2}$ is a linear or branched alkyl group, which preferably has 1 to 18 carbon atoms, more preferably 1 to 12 carbon atoms, and even more preferably 1 to 6 carbon atoms. Examples thereof include methyl, ethyl, n-propyl, isopropyl, n-butyl, t-butyl, n-pentyl, n-hexyl, n-octyl, t-octyl, n-decyl, and n-octadecyl.

The alkyl group for $R^{D1}$ and $R^{D2}$ may have a substituent, and examples of the substituent include those substituents that the alkyl group for $R^{A1}$ to $R^{A3}$ of Formula (I) may have.

In a case in which the alkyl group for $R^{D1}$ and $R^{D2}$ has a substituent, the alkyl group moiety preferably has 1 to 6 carbon atoms, and more preferably 1 to 3 carbon atoms.

The ring that is formed when $R^{D1}$ and $R^{D2}$ are bonded to each other is preferably a 5-membered or 6-membered ring, and a pyrrolidine ring, a piperazine ring, a piperidine ring, a morpholine ring, and a thiomorpholine ring are preferred.

Furthermore, any one between $R^{D1}$ and $R^{D2}$ is preferably a hydrogen atom or a methyl group, and more preferably a hydrogen atom.

According to the invention, it is also preferable for the other monofunctional polymerizable compound to have a dissociable group, a cationic group, an anionic group, or a polar substituent in the substituent of the alkyl group for $R^{D1}$ or $R^{D2}$, in order to impart a function to the polymer membrane.

Among cationic groups, according to the invention, an onio group (an ammonio group, a pyridinio group, a sulfonio group, or the like) is preferred as in the case of the monofunctional polymerizable compound represented by Formula (B), and an onio group represented by the following Formula (ON) or (OS) is more preferred.

However, in the case of an onio group represented by the following Formula (ON), the compound is a compound other than the monofunctional polymerizable compound represented by Formula (B).

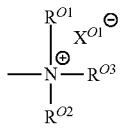

Formula (ON)

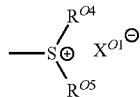

Formula (OS)

In Formula (ON) or (OS), $R^{O1}$ to $R^{O5}$ each independently represent an alkyl group or an aryl group. Here, at least two of $R^{O1}$, ... or $R^{O3}$, or $R^{O4}$ or $R^{O5}$ may be bonded to each other and form a ring. $X^{O1-}$ represents an anion.

The alkyl group for $R^{O1}$ to $R^{O5}$ preferably has 1 to 18 carbon atoms, more preferably 1 to 12 carbon atoms, and even more preferably 1 to 6 carbon atoms.

The alkyl group for $R^{O1}$ to $R^{O5}$ may have a substituent, and examples of the substituent include the substituents that the alkyl group for $R^{A1}$ to $R^{A3}$ in Formula (I) may have.

Regarding the substituent that substitutes the alkyl group for $R^{O1}$ to $R^{O5}$, among them, an aryl group is preferred. The alkyl group substituted with such an aryl group is preferably a benzyl group.

The aryl group for $R^{O1}$ to $R^{O5}$ preferably has 6 to 18 carbon atoms, and more preferably 6 to 12 carbon atoms.

The aryl group for $R^{O1}$ to $R^{O5}$ may have a substituent, and examples of the substituent include the substituents that the alkyl group for $R^{A1}$ to $R^{A3}$ in Formula (I) may have.

The ring formed when two of $R^{O1}$ to $R^{O5}$ that are bonded to the same atom are bonded to each other, is preferably a 5-membered or 6-membered ring.

Such a ring is preferably a nitrogen-containing aromatic ring in Formula (ON), and above all, a pyridine ring is preferred.

Examples of the anion of $X^{O1}$ include a halogen ion, a carboxylic acid ion (for example, acetate ion or benzoate ion), sulfate ion, an organic sulfate ion (for example, methanesulfonate ion, benzenesulfonate ion, or p-toluenesulfonate ion), and $OH^-$.

Examples of the group represented by Formula (ON) include trimethylammonio, triethylammonio, tributylammonio, dimethylbenzylammonio, dimethylphenylammonio, dimethylcetylammonio, and pyridinio.

Examples of the group represented by Formula (OS) include dimethylsulfonio, methylbenzylsulfonio, and methylphenylsulfonio.

Among the onio groups represented by Formulae (ON) and (OS), a group represented by Formula (ON) is preferred.

Among the substituents that the alkyl group for $R^{O1}$ to $R^{O5}$ may have, a polar group is preferred in addition to the onio group described above; an acyl group and an amino group are more preferred; and an amino group is particularly preferred. The amino group is preferably a tertiary amino group, and more preferably a group represented by the following Formula (N).

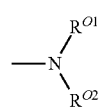

Formula (N)

In Formula (N), $R^{O1}$ and $R^{O2}$ have the same meanings as corresponding $R^{O1}$ and $R^{O2}$ in Formula (ON), respectively, and preferred ranges thereof are also the same.

Examples of the group represented by Formula (N) include dimethylamino and diethylamino.

Compounds represented by Formula (C), which have a (meth)acrylamide structure, are shown below; however, the invention is not intended to be limited to these.

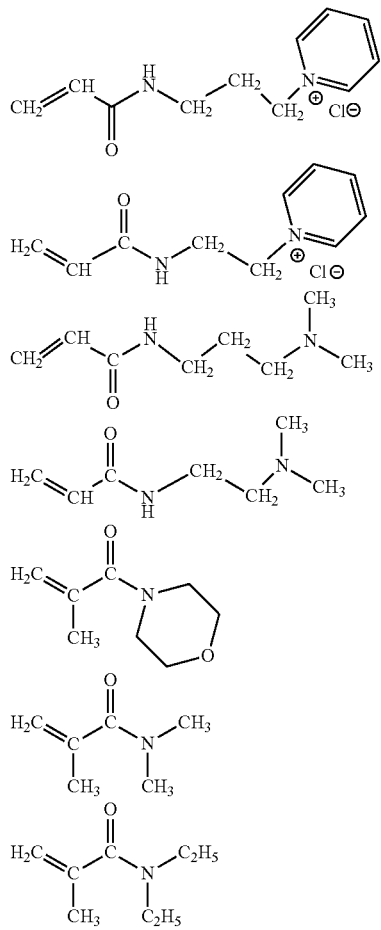

The monofunctional polymerizable compounds represented by Formula (B) or Formula (C) are commercially available from Kohjin Film & Chemicals Co., Ltd., KH Neochem Co., Ltd., Fluka Chemical Corporation, Sigma-Aldrich Co. LLC., and Toagosei Co., Ltd., and the compounds can also be synthesized by arbitrary methods.

<Mass Average Molecular Weight>

The mass average molecular weight of the crosslinked polymer that constitutes the functional polymer membrane of the invention is several hundred thousands or more because three-dimensional crosslinks have been formed, and the mass average molecular weight substantially cannot be measured. Generally, the mass average molecular weight of the crosslinked polymer is regarded to be infinite.

<Polymerization Initiator>

It is preferable that the curable composition used for the invention includes a polymerization initiator.

Among polymerization initiators, according to the invention, a photopolymerization initiator capable of performing polymerization by irradiation with energy rays is preferred.

Examples of the photopolymerization initiator include an aromatic ketone, an acylphosphine compound, an aromatic onium salt compound, an organified oxide, a thio compound, a hexaarylbiimidazole compound, a ketoxime ester compound, a borate compound, an azinium compound, a met- allocene compound, an active ester compound, a compound having a carbonhalogen bond, and an alkylamine compound.

Preferred examples of the aromatic ketone, acylphosphine oxide compound, and thio compound include compounds having a benzophenone skeleton or a thioxanthone skeleton described in "Radiation Curing in Polymer Science and Technology", pp. 77-117 (1993). More preferred examples include the α-thiobenzophenone compounds described in JP1972-6416B (JP-S47-6416B); the benzoin ether compounds described in JP1972-3981B (JP-S47-3981B); the α-substituted benzoin compounds described in JP1972-22326B (JP-S47-22326B); the benzoin derivatives described in JP1972-23664B (JP-S47-23664B); the aroylphosphonic acid esters described in JP1982-30704A (JP-S57-30704A); the dialkoxybenzophenones described in JP1985-26483B (JP-S60-26483B); the benzoin ethers described in JP1985-26403B (JP-S60-26403B) and JP1987-81345A (JP-562-81345A); the α-aminobenzophenones described in JP1989-34242B (JP-H01-34242B), U.S. Pat. No. 4,318,791A, and EP0284561A1; p-di(dimethylaminobenzoyl)benzene described in JP1990-211452A (JP-H02-211452A); the thio-substituted aromatic ketones described in JP1986-194062A (JP-S61-194062A); the acylphosphine sulfides described in JP1990-9597B (JP-H02-9597B); the acylphosphines described in JP1990-9596B (JP-H02-9596B); the thioxanthones described in JP1988-61950B (JP-S63-61950B); and the coumarines described in JP1984-42864B (JP-S59-42864B). Also, the polymerization initiators described in JP2008-105379A and JP2009-114290A are also preferable. Furthermore, the polymerization initiators described in KATO, Kiyomi, "Shigaisen Koka Shisutemu (Ultraviolet Curing Systems)" (published by Sogo Gijutsu Center, Ltd.; 1989), pp. 65-148, may be used.

In this invention, a water-soluble polymerization initiator is preferable.

Here, a polymerization initiator being water-soluble means that the polymerization initiator dissolves in distilled water at 25° C. in an amount of 0.1% by mass or more. It is more preferable that a water-soluble photopolymerization initiator dissolves in distilled water at 25° C. in an amount of 1% by mass or more, and even more preferably in an amount of 3% by mass or more.

Among these, a photopolymerization initiator suitable for the curable composition used for the invention is an aromatic ketone (particularly, an α-hydroxy-substituted benzoin compound) or an acylphosphine oxide compound. Particularly, p-phenylbenzophenone (manufactured by Wako Pure Chemical Industries, Ltd.), bis(2,4,6-trimethylbenzoyl)phenylphosphine oxide (IRGACURE (registered trademark) 819, trade name, manufactured by BASF Japan, Ltd.), 2,4,6-trimethylbenzoyldiphenylphosphine oxide (DAROCUR (registered trademark) TPO, trade name, manufactured by BASF Japan, Ltd.), 2-benzyl-2-dimethylamino-1-(4-morpholinophenyl)-butanone-1 (IRGACURE (registered trademark) 369, trade name, manufactured by BASF Japan, Ltd.), 2-methyl-1-(4-methylthiophenyl)-2-morpholinopropan-1-one (IRGACURE (registered trademark) 907, trade name, manufactured by BASF Japan, Ltd.), 1-[4-(2-hydroxyethoxy)-phenyl]-2-hydroxy-2-methyl-1-propan-1-one (IRGACURE (registered trademark) 2959, trade name, manufactured by BASF Japan, Ltd.), and 2-hydroxy-2-methyl-1-phenyl-propan-1-one (DAROCUR (registered trademark) 1173, trade name, manufactured by BASF Japan, Ltd.) are preferred, and from the viewpoints of water-solubility and resistance to hydrolysis, IRGACURE (registered trademark) 2959 (trade name, manufactured by BASF Japan, Ltd.) and DAROCUR (registered trademark) 1173 (trade name, manufactured by BASF Japan, Ltd.) are most preferred.

According to the invention, the content of the polymerization initiator is preferably 0.1 parts by mass to 10 parts by mass, more preferably 0.1 parts by mass to 5 parts by mass, and even more preferably 0.3 parts by mass to 2 parts by mass, relative to 100 parts by mass of the total solid content mass in the curable composition.

<Polymerization Inhibitor>

It is also preferable that the curable composition used for the invention includes a polymerization inhibitor.

Regarding the polymerization inhibitor, any arbitrary polymerization inhibitor can be used, and examples thereof include a phenolic compound, a hydroquinone compound, an amine compound, a mercapto compound, and a nitroxyl radical compound.

Specific examples of the phenolic compound include a hindered phenol (a phenol having a t-butyl group at the ortho-position, and a representative example is 2,6-di-t-butyl-4-methylphenol), and a bisphenol. Specific examples of the hydroquinone compound include monomethyl ether hydroquinone. Specific examples of the amine compound include N-nitroso-N-phenylhydroxylamine and N,N-diethylhydroxylamine Specific examples of the nitroxyl radical compound include 4-hydroxy-TEMPO (4-hydroxy-2,2,6,6-tetramethylpiperidine 1-oxyl free radical).

Meanwhile, these polymerization inhibitors may be used singly, or in combination of two or more kinds thereof.

The content of the polymerization inhibitor is preferably 0.001 parts by mass to 5 parts by mass, more preferably 0.005 parts by mass to 1 part by mass, and even more preferably 0.005 parts by mass to 0.5 parts by mass, relative to 100 parts by mass of the total solid content mass in the curable composition.

<Solvent>

The curable composition used for the invention may include a solvent. The content of the solvent in the curable composition is preferably 5% by mass to 45% by mass, more preferably 10% by mass to 42% by mass, even more preferably 10% by mass to 40% by mass, and particularly preferably 10% by mass to 37% by mass, relative to 100% by mass of the entire curable composition.

If the curable composition includes a solvent, the curing (polymerization) reaction proceeds uniformly and smoothly. Furthermore, in a case in which a porous support is impregnated with the curable composition, impregnation proceeds smoothly.

For the solvent, water, or a mixed liquid of water and a solvent having a solubility in water of 5% by mass or more is preferably used, and it is preferable that the solvent is freely miscible with water. For this reason, a solvent selected from water and a water-soluble solvent is preferable.

Particularly preferred examples of the water-soluble solvent include an alcohol-based solvent, an ether-based solvent which is an aprotic polar solvent, an amide-based solvent, a ketone-based solvent, a sulfoxide-based solvent, a sulfone-based solvent, a nitrile-based solvent, and an organic phosphorus-based solvent.

Examples of the alcohol-based solvent include methanol, ethanol, isopropanol, n-butanol, ethylene glycol, propylene glycol, diethylene glycol, and dipropylene glycol. These can be used singly, or two or more kinds can be used in combination.

Furthermore, preferred examples of the aprotic polar solvent include dimethyl sulfoxide, dimethylimidazolidinone, sulfolane, N-methylpyrrolidone, dimethylformamide, acetonitrile, acetone, dioxane, tetramethylurea, hexamethylphosphoramide, hexamethylphosphorotriamide, pyridine, propionitrile, butanone, cyclohexanone, tetrahydrofuran, tetrahydropyran, ethylene glycol diacetate, and γ-butyrolactone. Among them, dimethyl sulfoxide, N-methylpyrrolidone, dimethylformamide, dimethylimidazolidinone, sulfolane, acetone or acetonitrile, and tetrahydrofuran are preferred. These can be used singly, or two or more kinds thereof can be used in combination.

The curable composition used for the invention may include, for example, a surfactant, a viscosity improving agent, a surface tension adjusting agent, and a preservative, as necessary.

Regarding the surfactant, a silicone-based surfactant and a fluorine-based surfactant are suitably used. Particularly, a fluorine-based surfactant is suitably used. For example, CAPSTONE (registered trademark) FS-30 and FS-51 (trade names, all manufactured by Du Pont Kabushiki Kaisha); and SURFLON (registered trademark) S-241, S-242, S-243, S-386, S-231, S-232, and S-233 (trade names, all manufactured by AGC Seimi Chemical Co., Ltd.) are preferably used.

The surfactant may be any one of an anionic surfactant, a cationic surfactant, a nonionic surfactant, and an amphoteric surfactant. According to the invention, a nonionic surfactant or an amphoteric surfactant is preferred, and a nonionic surfactant is more preferred.

The content of the surfactant in the curable composition is preferably 0.01% by mass to 2% by mass, more preferably 0.01% by mass to 0.5% by mass, and even more preferably 0.01% by mass to 0.20% by mass, relative to 100% by mass of the entire curable composition.

<Surface Tension>

The surface tension at 25° C. of the curable composition used for the invention is preferably from 15 mN/m to 30 mN/m, more preferably from 15 mN/m to 27 mN/m, even more preferably from 15 mN/m to 25 mN/m, and particularly preferably from 15 mN/m to 23 mN/m.

By lowering the surface tension of the curable composition, the permeation rate into the porous support is increased, and the rate of production at the time of continuously producing a functional polymer membrane can be increased.

Regarding the means for lowering the surface tension of the curable composition, the surfactants described above are used.

<Liquid Absorption Time>

The liquid absorption time of the curable composition used for the invention into a porous support is preferably 45 seconds/1 μL or less, more preferably 25 seconds/1 μL or less, even more preferably 20 seconds/1 μL or less, and particularly preferably 15 seconds/1 μL or less.

The liquid absorption time as used herein refers to the time taken from the contact between a liquid droplet and a porous support made by mounting 1 μL of a liquid droplet of a curable composition on a porous support, to completion of the absorption of the entire amount of the liquid droplet by the porous support.

Meanwhile, in this invention, the liquid absorption time is the time for liquid absorption into a nonwoven fabric (porous support, composite fibers of polyethylene and polypropylene, fiber length: 2 μm to 10 μm, thickness: 57 μm, basis weight: 18 g/m²), which is a porous support used in Examples.

The rate of permeation into the porous support can be evaluated based on the liquid absorption time. As the liquid absorption time is shorter, the production rate in continuous production can be increased.

Meanwhile, the lower limit is not particularly limited; however, the liquid absorption time is practically 1 second/1 µL or more.

<Contact Angle>

The contact angle of water at the membrane surface of the functional polymer membrane of the invention is preferably from 70° to 120°, more preferably from 80° to 120°, even more preferably from 85° to 120°, and particularly preferably from 90° to 120°.

The contact angle of water as used herein is a value measured with respect to a membrane in a dry state. A dry state means a state in which a membrane is immersed in pure water for 16 hours or longer, the membrane taken out from pure water is dried for 16 hours or longer at 60° C. under reduced pressure, and then the membrane is left to stand in air at room temperature for 8 hours or longer.

Next, each of the steps of the method for producing the functional polymer membrane of the invention will be explained.

The functional polymer membrane of the invention can be produced using a temporary support (after completion of the curing reaction, detached from the membrane). However, in this invention, since a porous support that becomes a portion of the functional polymer membrane is used, it is preferable that the functional polymer membrane is produced using this porous support, without using a temporary support.

Furthermore, the functional polymer membrane can be produced in a batch mode (batch system) using a fixed porous support, or can also be produced in a continuous mode (continuous system) using a moving porous support.

Meanwhile, in the case of using a temporary support, this temporary support may be any support as long as it is not necessary to consider material penetration, and the temporary support can be fixed for membrane formation, including, for example, a metal plate such as an aluminum plate.

The curable composition used for the invention can be applied on or immersed (impregnated) into a porous support by various methods, for example, curtain coating, extrusion coating, air knife coating, slide coating, nip roll coating, forward roll coating, reverse roll coating, immersion coating, kiss coating, rod bar coating, or spray coating. Applying of plural layers can be carried out simultaneously or continuously. In order to apply multiple layers simultaneously, curtain coating, slide coating, slot die coating, and extrusion coating are preferred.

Production of a functional polymer membrane in a continuous system is carried out by continuously applying the curable composition used for the invention on a moving porous support, more preferably using a production unit which includes a curable composition coating part; a radiation source for polymerizing and curing the curable composition; a membrane winding part for collecting a formed membrane; and a means for moving a porous support from the curable composition coating part to the radiation source and the membrane winding part.

In the present Production Example, the functional polymer membrane of the invention is produced by a process of (i) applying a curable composition on a porous support, and (ii) subjecting the curable composition to a polymerization curing reaction through irradiation with light.

In the production unit described above, the curable composition coating part can be disposed at a position upstream to the radiation source, and the radiation source is disposed at a position upstream to the membrane winding part.

In order to have fluidity that is sufficient for applying the curable composition with a high-speed coating machine, the viscosity of the curable composition according to the invention is preferably less than 4,000 mPa·s, more preferably 1 mPa·s to 1,000 mPa·s, and even more preferably 1 mPa·s to 500 mPa·s. In the case of a coating method such as slide bead coating, the viscosity is preferably 1 mPa·s to 200 mPa·s. In order to adjust the viscosity of the curable composition to the above-described viscosity, the temperature of the composition may be adjusted, or a viscosity-adjusting agent may be used.

In a high-speed coating machine, the curable composition used for the invention can be applied on a porous support that moves at a speed of higher than 15 m/min, for example, at a speed of higher than 20 m/min.

Particularly, in this invention, since a porous support is used, it is preferable that the crosslinked polymer electrolyte is subjected to a gas treatment, preferably a fluorine gas surface treatment. Furthermore, in order to improve wettability and adhesive force of the porous support, it is preferable that after the porous support is subjected to, for example, a corona discharge treatment, a glow discharge treatment, a flame treatment, an ultraviolet irradiation treatment or the like, the curable composition is applied on the gas-treated porous support.

During the polymerization curing reaction, a polymerizable compound represented by Formula (A) and a monofunctional polymerizable compound represented by Formula (B) are polymerized and form a crosslinked polymer. It is preferable that the polymerization curing reaction involves light irradiation under the conditions in which a functional polymer membrane can be formed within 30 seconds.

Regarding the polymerization curing reaction of the curable composition used for the invention, a porous support is impregnated with the curable composition (may also be applied on), and then the polymerization curing reaction is initiated preferably within 60 seconds, more preferably within 15 seconds, even more preferably within 5 seconds, and particularly preferably within 3 seconds.

In the polymerization curing reaction, the curable composition is irradiated with light for preferably less than 10 seconds, more preferably less than 5 seconds, even more preferably less than 3 seconds, and particularly preferably less than 2 seconds. In a continuous method, irradiation is performed continuously, and the polymerization curing reaction time is determined by the speed at which the curable composition moves passing through the irradiation beam.

In a case in which ultraviolet radiation (UV light) of high intensity is used for the polymerization curing reaction, there is a possibility that a significant amount of heat may be generated. Thus, in order to prevent overheating, it is preferable that the lamp of the light source and/or the porous support/membrane is cooled with cooling air or the like. There are occasions in which a significant dose of infrared light (IR light) is radiated together with a UV beam, and in this case, it is preferable to radiate UV light through a filter of an IR-reflective quartz plate.

It is preferable to use ultraviolet radiation for the polymerization curing reaction. A suitable wavelength is such that, under the conditions that the absorption wavelength of an arbitrary photopolymerization initiator included in the curable composition matches the wavelength, examples include UV-A (400 to >320 nm), UVB (320 to >280 nm), and UV-C (280 to 200 nm).

Suitable examples of an ultraviolet radiation source include a mercury arc lamp, a carbon arc lamp, a low-pressure mercury lamp, a medium-pressure mercury lamp, a high-pressure mercury lamp, a swirl flow plasma arc lamp, a metal halide lamp, a xenon lamp, a tungsten lamp, a halogen lamp, a laser, and an ultraviolet-emitting diode. A medium-pressure or high-pressure mercury vapor type ultraviolet-emitting lamp is particularly preferable. In addition to this, in order to modify the emission spectrum of the lamp, additives such as a metal halide may be incorporated. A lamp having an emission maximum at 200 nm to 450 nm is particularly suitable.

The energy output of the radiation source is preferably 20 W/cm to 1,000 W/cm, and more preferably 40 W/cm to 500 W/cm, and as long as a desired exposure dose can be realized, the energy output may be higher than this, or may be lower than this. The degree of curing of an ion-exchange membrane can be adjusted by varying the intensity of exposure.

The exposure dose is preferably 40 mJ/cm$^2$ or more, more preferably 70 mJ/cm$^2$ to 2,000 mJ/cm$^2$, and even more preferably 100 mJ/cm$^2$ to 1,000 mJ/cm$^2$, as measured using a high energy UV radiometer (UV POWER PUCK™ available from EIT-Instrument Markets, Inc.) in the UV-A range indicated in the apparatus. The exposure time can be freely selected. Meanwhile, a shorter exposure time is more preferable, and the exposure time is typically shorter than 2 seconds.

In this invention, it is preferable that the membrane is formed by impregnating the porous support with the curable composition, and then subjecting the curable composition to a polymerization curing reaction. Thereby, for example, a crosslinked polymer obtained from a monomer having a (meth)acrylamide skeleton, which has a structure represented by Formula (I), is embedded in the pores, and thereby the crosslinked polymer can constitute a portion of the membrane.

The state in which a crosslinked polymer is embedded in the pores of a porous support implies, although it is not intended to be limiting, a state in which the crosslinked polymer exists in the pores of the porous support. That is, it is desirable if the crosslinked polymer exists in a portion or in all of the pores, and a state in which the entirety of the porous support is coated with the crosslinked polymer is also included.

Meanwhile, in a case in which the coating speed is fast, it is preferable to use plural radiation sources in order to obtain the required exposure dose. In this case, the amounts of light or intensities of the plural radiation sources may be identical or different.

The functional polymer membrane of the invention is mainly intended to be used particularly as an ion-exchange membrane. However, the functional polymer membrane of the invention is not intended to be limited to an ion-exchange membrane, and it is considered that the functional polymer membrane can also be suitably used as, for example, a reverse osmosis membrane, a forward osmosis membrane, or a gas separation membrane.

EXAMPLES

Hereinafter, the invention will be explained in more detail by way of Examples; however, the invention is not intended to be limited to these Examples. Meanwhile, unless particularly stated otherwise, the units "parts" and "percent (%)" are on a mass basis.

—Synthesis of Polymerizable Compound 1—

Polymerizable compound 1 was synthesized by the following synthesis scheme.

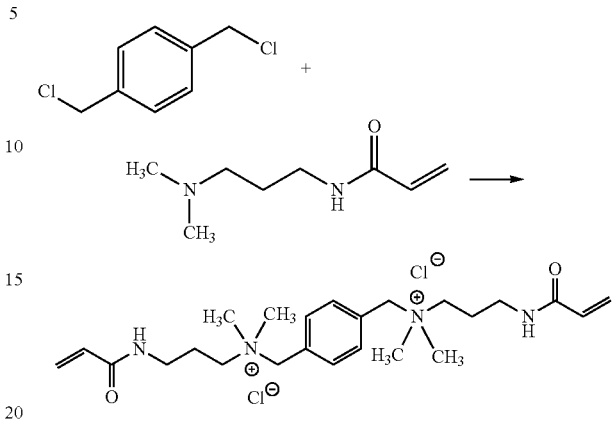

To a mixed solution of 175 g of para-dichloroxylene (1.00 mol, manufactured by Tokyo Chemical Industry Co., Ltd.), 1220 g of acetonitrile, 244 g of methanol, and 1 g of t-butyl hydroperoxide (manufactured by Tokyo Chemical Industry Co., Ltd.), 313 g of N-[3-(dimethylaminopropyl)acrylamide] (2.00 mol, manufactured by Tokyo Chemical Industry Co., Ltd.) was added, and the mixture was heated and stirred for 2 hours at 50° C. Subsequently, 1220 g of acetone was added to the reaction solution, and the mixture was stirred for 1 hour at room temperature (25° C.). Crystals thus generated were filtered, and thus 450 g of white crystals of the polymerizable compound 1 (yield: 92%) were obtained. The water content of the polymerizable compound 1 was measured by the Karl-Fischer method, and the water content was 7.0%.

—Synthesis of Polymerizable Compound 2—

Polymerizable compound 2 was synthesized by the following synthesis scheme.

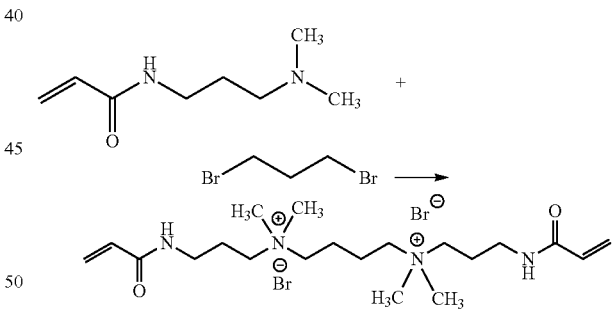

To a mixed solution of 80.8 g of 1,3-dibromopropane (0.40 mol, manufactured by Wako Pure Chemical Industries, Ltd.), 0.617 g of methoxyphenol (manufactured by Wako Pure Chemical Industries, Ltd.), 309 ml of acetonitrile, and 103 ml of methanol, 125 g of N-[3-(dimethylamino)propyl] acrylamide (0.80 mol, manufactured by Wako Pure Chemical Industries, Ltd.) was added, and the mixture was heated and stirred for 7 hours at 50° C. Subsequently, 2.2 L of acetone was added to the reaction solution, the supernatant was removed by decantation, and then 0.1 g of methoxyphenol and 30 g of water were added thereto. The mixture was concentrated for 30 minutes at 35° C. and 40 mmHg, and thus 188 g of a 81% solution of the polymerizable compound 2 (moisture content: 19%, yield: 74%) was obtained.

(Surface Treatment of Porous Support)

A nonwoven fabric (porous support, composite fibers of polyethylene and polypropylene, fiber length: 2 μm to 10 μm, thickness: 80 and basis weight: 18 g/m$^2$) was supplied into a container filled with fluorine gas as well as oxygen gas or a mixed gas of sulfur dioxide gas and oxygen gas, and the nonwoven fabric was brought into contact with the mixed gas for 100 seconds to 200 seconds (temperature: 20° C.). The concentrations of the oxygen gas and the sulfur dioxide gas were regulated such that the surface composition of the porous support would have the values indicated in the following Table 2.

Then, this nonwoven fabric that had been brought into contact with the mixed gas was dried using a dryer set at a temperature of 80° C., and then was subjected to a calendering treatment. Thus, porous supports A to F that were surface-treated so as to obtain thicknesses (μm) having the values indicated in the following Table 2 were produced.

Meanwhile, in the following Table 2, porous supports A to F are simply described as supports A to F, respectively.

(Production of Anion-Exchange Membrane)

A coating liquid of a curable composition having the composition (unit: g) indicated in the following Table 1 was applied on an aluminum plate using a wire bar (a stainless steel rod wound with a wire having a thickness of 150 μm at an interval of 1 lap/3 cm (length direction)), manually at a rate of about 5 m/min. Subsequently, the surface-treated porous support described above was impregnated with the coating liquid. Any excess coating liquid was removed using a rod that was not wound with a wire. The temperature of the coating liquid at the time of application was about 50° C. Subsequently, the coating liquid-impregnated porous support was subjected to a polymerization curing reaction using a UV exposure machine (manufactured by Fusion UV Systems, Inc., Model LIGHT HAMMER (registered trademark) LH10 (trade name), D-bulb, rate: 5 m/min, and 60% intensity), and thereby an anion-exchange membrane was produced. The amount of exposure measured with POWER PUCK (registered trademark) (manufactured by EIT-Instrument Markets, Inc., an exposure amount measuring machine) was 750 mJ/cm$^2$. The membrane thus obtained was removed from the aluminum plate, and was stored in a 0.1 M NaCl solution for at least 12 hours. Thus, anion-exchange membranes of Examples 1 to 10 and Comparative Examples 1 to 4 were produced.

The anion-exchange membranes produced in Examples 1 to 10 and Comparative Examples 1 to 4 were evaluated for the following items. The results thus obtained are summarized and shown in the following Table 2.

[Film Thickness]

The film thickness of an anion-exchange membrane after storage for at least 12 hours in a 0.1 M NaCl solution was measured using a micrometer.

[Porosity]

Porosity was calculated using the following calculation equation. Meanwhile, calculation was performed by taking the density of the material as 0.92 g/cm$^3$.

Porosity(%)=100−(mass per unit area [g/m$^2$] of porous support/(10,000×density [g/cm$^3$] of material constituting porous support×thickness [cm] of porous support))

[Electrical Resistance of Membrane (Ω·Cm$^2$)]

Both surfaces of a membrane that had been immersed for about 2 hours in a 0.5 M aqueous NaCl solution were wiped with dry filter paper, and the membrane was inserted into a two-chamber type cell (effective membrane area: 1 cm$^2$, a platinum electrode was used as an electrode). The two chambers were each filled with 20 mL of 0.5 M NaCl, and the cell was placed in a constant temperature water tank at 25° C. and was left to stand until equilibrium was reached. After the liquid temperature in the cell reached 25° C., the electrical resistance $r_1$ was measured using an alternating current bridge (frequency: 1,000 Hz).

Next, the membrane was removed to leave only the 0.5 M aqueous NaCl solution, and the electrical resistance $r_2$ between the two poles was measured. Thus, the electrical resistance R (Ω·cm$^2$) of the membrane was determined as $r_1$-$r_2$.

In Table 2, the "electrical resistance of the membrane" is described briefly as "membrane resistance".

Furthermore, for the elemental composition at the support surface in Table 2, a value measured at a depth (about 5 nm) that was measured by X-ray photoelectron spectroscopy using an AlKα radiation as an X-ray source, under the measurement conditions of a photoelectron take-off angle of 45° and pass energy of 55 eV, is described. Meanwhile, the proportion of the number of atoms of a predetermined atom, in a case in which the total number of atoms (excluding hydrogen and helium) present at the surface of the porous support is designated as 100 atom %, is described as atom %.

[Coefficient of Water Permeability (mL/m$^2$/Pa/Hr)]

The coefficient of water permeability of a membrane was measured using an apparatus having the flow channels 10 illustrated in FIG. 1. In FIG. 1, reference numeral 1 represents a membrane; reference numerals 3 and 4 represent the flow channels of a feed solution (pure water) and a draw solution (3 M NaCl), respectively. Also, the arrow of reference numeral 2 represents the flow of water separated from the feed solution.

400 mL of a feed solution and 400 mL of a draw solution were brought into contact through a membrane (membrane contact area: 18 cm$^2$), and each solution was caused to flow at a flow rate of 0.11 cm/second in the direction of the arrow of reference numeral 5 using a peristaltic pump. The rate at which water from the feed solution permeates into the draw solution through the membrane was analyzed by measuring the masses of the feed solution and the draw solution in real time, and thus the coefficient of water permeability was determined.

[Ratio of Coefficient of Water Permeability/Ion Permeability (Ml/m$^2$/Pa/Hr/s·cm$^2$)]

The ratio between the coefficient of water permeability (ml/m$^2$/Pa/hr) and ion permeability (S/cm$^2$) (coefficient of water permeability/ion permeability) (ml/m$^2$/Pa/hr/S·cm$^2$) is also described in Table 2. Here, ion permeability is represented by [1/membrane resistance (Ω·cm')].

Meanwhile, in Table 2, the values are described without using 10$^{-5}$ and the unit. For example, in Example 1, the value 11.2 is described in Table 2, but the actual value is 11.2×10$^{-5}$ (ml/m$^2$/Pa/hr/S·cm$^2$).

TABLE 1

| | Curable composition A | Curable composition B | Curable composition C | Curable composition D | Curable composition E | Curable composition F | Curable composition G | Curable composition H |
|---|---|---|---|---|---|---|---|---|
| Pure water | 22.67 | 9.74 | 22.83 | 10.61 | 22.83 | 22.83 | 22.83 | 22.83 |
| IPA | 4.89 | 0.00 | 5.58 | 0.00 | 5.58 | 5.58 | 5.58 | 5.58 |
| MEHQ | 0.077 | 0.084 | 0.077 | 0.00 | 0.077 | 0.077 | 0.077 | 0.077 |
| 4OH-TEMPO | 0.00 | 0.00 | 0.00 | 0.0052 | 0.00 | 0.00 | 0.00 | 0.00 |
| DMAPAA-Q | 13.1 | 0.00 | 13.1 | 0.00 | 13.1 | 13.1 | 13.1 | 13.1 |
| Polymerizable compound 1 | 58.0 | 0.0 | 58.0 | 0.0 | 58.0 | 58.0 | 58.0 | 58.0 |
| Polymerizable compound 2 | 0.0 | 88.9 | 0.0 | 88.9 | 0.0 | 0.0 | 0.0 | 0.0 |
| DAROCUR 1173 | 0.42 | 0.45 | 0.42 | 0.45 | 0.42 | 0.42 | 0.42 | 0.42 |
| TEGOGLIDE 432 | 0.85 | 0.80 | 0.00 | 0.00 | 0.00 | 0.00 | 0.00 | 0.00 |
| CAPSTONE FS-30 | 0.00 | 0.00 | 0.50 | 0.10 | 0.00 | 0.00 | 0.00 | 0.00 |
| CAPSTONE FS-51 | 0.00 | 0.00 | 0.00 | 0.00 | 0.03 | 0.00 | 0.00 | 0.00 |
| SURFLON S-241 | 0.00 | 0.00 | 0.00 | 0.00 | 0.00 | 0.20 | 0.00 | 0.00 |
| SURFLON S-243 | 0.00 | 0.00 | 0.00 | 0.00 | 0.00 | 0.00 | 0.20 | 0.00 |
| SURFLON S-231 | 0.00 | 0.00 | 0.00 | 0.00 | 0.00 | 0.00 | 0.00 | 0.20 |
| total | 100.0 | 100.0 | 100.0 | 100.0 | 100.0 | 100.0 | 100.0 | 100.0 |

[Description of Abbreviations and Structures of Compounds in Table 1]

IPA: Isopropyl alcohol

MEHQ: Monomethyl ether hydroquinone

DMAPA A-Q: Dimethylaminopropylacrylamide methyl chloride quaternary salt (3-acrylamidopropyltrimethylammonium chloride)

DAROCUR (registered trademark) 1173: trade name, manufactured by BASF SE

TEGOGLIDE (registered trademark) 432: trade name; manufactured by Evonik Industries AG 4OH-TEMPO: 4-Hydroxy-TEMPO, manufactured by Tokyo Chemical Industries Co., Ltd.

CAPSTONE (registered trademark) FS-30: trade name, manufactured by Du Pont Kabushiki Kaisha, surfactant content: 25% by mass CAPSTONE (registered trademark) FS-51: trade name, manufactured by Du Pont Kabushiki Kaisha, surfactant content: 40% by mass SURFLON (registered trademark) S-241: trade name, manufactured by AGC Seimi Chemical Co., Ltd., surfactant content: 30% by mass SURFLON (registered trademark) S-243: trade name, manufactured by AGC Seimi Chemical Co., Ltd., surfactant content: 100% by mass SURFLON (registered trademark) S-231: trade name, manufactured by AGC Seimi Chemical Co., Ltd., surfactant content: 35% by mass

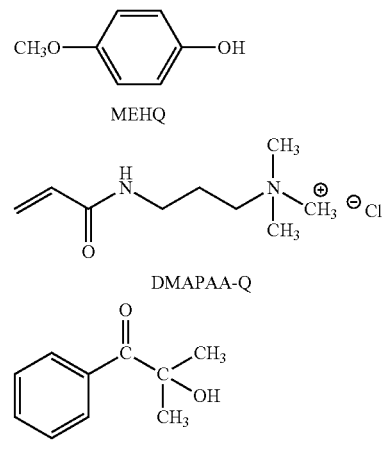

TABLE 2

| | Example 1 | Example 2 | Example 3 | Example 4 | Example 5 | Example 6 | Example 7 | Example 8 |
|---|---|---|---|---|---|---|---|---|
| Porous support | Support D | Support D | Support E | Support F | Support D | Support D | Support D | Support D |
| Gas treatment time (seconds) | 120 | 120 | 100 | 200 | 120 | 120 | 120 | 120 |
| Elemental composition of support surface — Oxygen atoms (atom %) | 18.6 | 18.6 | 15.5 | 19.8 | 18.6 | 18.6 | 18.6 | 18.6 |
| Elemental composition of support surface — Sulfur atoms (atom %) | 3.3 | 3.3 | 0.1 | 0.1 | 3.3 | 3.3 | 3.3 | 3.3 |
| Thickness of support (μm) | 57 | 57 | 56 | 56 | 57 | 57 | 57 | 57 |
| Porosity (%) | 65.7 | 65.7 | 65 | 65 | 65.7 | 65.7 | 65.7 | 65.7 |
| Curable composition | A | B | A | A | C | D | E | F |
| Film thickness (μm) | 78 | 74 | 76 | 75 | 70 | 69 | 70 | 71 |
| Evaluation results — Membrane resistance (Ω·cm²) | 1.30 | 1.31 | 1.29 | 1.31 | 1.29 | 1.28 | 1.28 | 1.29 |

TABLE 2-continued

|  | | | | | | | | |
|---|---|---|---|---|---|---|---|---|
| Ion permeability (=1/membrane resistance (S/cm$^2$)) | 0.77 | 0.76 | 0.78 | 0.76 | 0.78 | 0.78 | 0.78 | 0.78 |
| Coefficient of water permeability (mL/m$^2$/Pa/hr) | $8.6 \times 10^{-5}$ | $8.0 \times 10^{-5}$ | $8.8 \times 10^{-5}$ | $8.4 \times 10^{-5}$ | $8.6 \times 10^{-5}$ | $7.8 \times 10^{-5}$ | $8.5 \times 10^{-5}$ | $8.5 \times 10^{-5}$ |
| Ratio of coefficient of water permeability/ion permeability | 11.2 | 10.5 | 11.4 | 11.0 | 11.1 | 10.0 | 10.9 | 11.0 |

|  | | Example 9 | Example 10 | Comparative Example 1 | Comparative Example 2 | Comparative Example 3 | Comparative Example 4 |
|---|---|---|---|---|---|---|---|
| Porous support | | Support D | Support D | Support A | Support B | Support B | Support C |
| Gas treatment time (seconds) | | 120 | 120 | N/A | 50 | 50 | 70 |
| Elemental composition of support surface | Oxygen atoms (atom %) | 18.6 | 18.6 | 8.0 | 12.9 | 12.9 | 13.0 |
| | Sulfur atoms (atom %) | 3.3 | 3.3 | 0.1 | 0.3 | 0.3 | 0.1 |
| Thickness of support (μm) | | 57 | 57 | 55 | 55 | 55 | 57 |
| Porosity (%) | | 65.7 | 65.7 | 64.4 | 64.4 | 64.4 | 67.6 |
| Curable composition | | G | H | A | A | B | A |
| Film thickness (μm) | | 70 | 72 | 75 | 74 | 73 | 76 |
| Evaluation results | Membrane resistance (Ω · cm$^2$) | 1.28 | 1.29 | 1.10 | 1.13 | 1.15 | 1.12 |
| | Ion permeability (=1/membrane resistance (S/cm$^2$)) | 0.78 | 0.78 | 0.91 | 0.88 | 0.87 | 0.89 |
| | Coefficient of water permeability (mL/m$^2$/Pa/hr) | $8.5 \times 10^{-5}$ | $8.4 \times 10^{-5}$ | $13.7 \times 10^{-5}$ | $13.2 \times 10^{-5}$ | $12.2 \times 10^{-5}$ | $12.7 \times 10^{-5}$ |
| | Ratio of coefficient of water permeability/ion permeability | 10.9 | 10.8 | 15.1 | 14.9 | 14.0 | 14.2 |

As is obvious from Table 2, it is understood that anion-exchange membranes that satisfy the requirements of the surface composition of the porous support according to the invention and have a film thickness of less than 100 μm, have lower values of the ratio of coefficient of water permeability/ion permeability, compared to the anion-exchange membranes of Comparative Examples that do not satisfy the requirements of the surface composition of the porous support according to the invention.

For the anion-exchange membranes of Examples 1, 5 and 7 to 10, and the corresponding curable compositions and porous supports, the following items were evaluated. The results thus obtained are summarized and shown in the following Table 3.

[Surface Tension]

The surface tension of the curable composition was measured by the Wilhelmy method, using a surface tensiometer DY-700 (trade name, manufactured by Kyowa Interface Science Co., Ltd.). A glass plate was used as the plate. The surface tension at 25° C. was measured three times, and the average value was designated as the value of surface tension.

[Contact Angle]

The contact angle of the surface of an anion-exchange membrane was measured using a contact angle meter DM-500 (trade name, manufactured by Kyowa Interface Science Co., Ltd.). For the measurement solvent, pure water was used. Regarding the anion-exchange membrane to be analyzed, an anion-exchange membrane that had been immersed in pure water for 16 hours or longer, taken out from pure water, and then dried for 16 hours or longer at 60° C. under reduced pressure, was used. Meanwhile, after the anion-exchange membrane was taken out from a dryer, measurement was completed within 2 hours.

Regarding the value of the contact angle, the value obtained immediately after (within 2 seconds) the contact with water was employed. The measurement sites were varied, and the average value obtained by making three measurements was designated as the value of contact angle.

[Liquid Absorption Time]

The liquid absorption time of the curable composition into the porous support was measured.

1 μL of a liquid droplet of a curable composition was mounted on a porous support, and the time taken from the contact between the liquid droplet and the porous support, to completion of absorption of the entire amount of the liquid droplet by the porous support, was measured by visual inspection.

The measurement sites were varied, and the average value obtained by making three measurements was designated as the value of liquid absorption time. Meanwhile, the measurement sites were selected such that the sites where liquid droplets were mounted were separated apart from one another by 3 cm or more, and the sites were sufficiently far from porous support parts that had already absorbed liquid droplets so that the measurements would not be affected.

TABLE 3

|  | Example 1 | Example 5 | Example 7 | Example 8 | Example 9 | Example 10 |
|---|---|---|---|---|---|---|
| Porous support | Support D | Support D | Support D | Support D | Support D | Support D |
| Curable composition | Curable composition A | Curable composition C | Curable composition E | Curable composition F | Curable composition G | Curable composition H |
| Surface tension of curable composition (mN/m) | 28.8 | 21.4 | 20.2 | 18.7 | 24.8 | 19.8 |
| Liquid absorption time (seconds/1 μL) | 45 | 15 | 14 | 12 | 23 | 13 |
| Contact angle of membrane (degrees) | 72 | 93 | 94 | 95 | 88 | 94 |

As is obvious from Table 3, as the curable composition has lower surface tension, the liquid absorption time is shorter. Also, the contact angle of water at the membrane surface of the functional polymer membrane is larger. A shorter liquid absorption time is more advantageous from the viewpoint that the production rate can be increased at the time of continuously producing functional polymer membranes.

Having described the present invention as related to the present embodiments, it is our intention that the invention should not be limited by any of the details of the description, unless otherwise specified, but rather should be construed broadly within its spirit and scope as disclosed in the accompanying claims.

The present application claims priority on JP2014-039930 filed in Japan on Feb. 28, 2014; JP2014-094638 filed in Japan on May 1, 2014; and JP2014-156957 filed in Japan on Jul. 31, 2014, the disclosures of which are incorporated herein by reference.

EXPLANATION OF REFERENCES

1: membrane
2: arrow indicating the permeation of water in feed solution into draw solution through membrane
3: flow channel of feed solution
4: flow channel of draw solution
5: direction of movement of liquid
10: flow channels of apparatus for measuring coefficient of water permeability

What is claimed is:
1. A functional polymer membrane comprising:
a porous support; and
a crosslinked polymer electrolyte,
wherein the thickness of the functional polymer membrane is smaller than 100 μm,
the crosslinked polymer electrolyte is a crosslinked polymer formed by subjecting a composition including a monomer having a (meth)acrylamide skeleton to a polymerization curing reaction,
the porous support is formed of at least one of polyethylene and polypropylene, and
the proportion of elemental oxygen in the elemental composition excluding elemental hydrogen and helium at the surface of the porous support is from 14.0 atom % to 25.0 atom %.

2. The functional polymer membrane according to claim 1, wherein the proportion of elemental sulfur in the elemental composition excluding elemental hydrogen and helium at the surface of the porous support is from 0.1 atom % to 10.0 atom %.

3. The functional polymer membrane according to claim 1, wherein the porosity of the porous support is from 55% to 85%.

4. The functional polymer membrane according to claim 1, wherein the porous support is a nonwoven fabric.

5. The functional polymer membrane according to claim 1, wherein the crosslinked polymer has a substituent or a linking group, both of which include at least an ammonium salt and/or a pyridinium salt.

6. The functional polymer membrane according to claim 1, wherein the functional polymer membrane is formed by the crosslinked polymer electrolyte being embedded in the pores of the porous support.

7. The functional polymer membrane according to claim 1, wherein the crosslinked polymer has a structure represented by the following Formula (I):

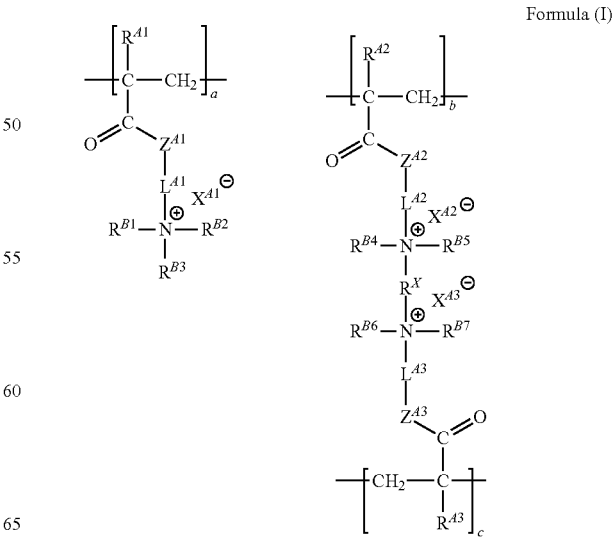

Formula (I)

wherein in Formula (I), $R^{41}$ to $R^{43}$ each independently represent a hydrogen atom or an alkyl group; $R^{B1}$ to $R^{B7}$ each independently represent an alkyl group or an aryl group; $Z^{41}$ to $Z^{43}$ each independently represent —NRa—, where Ra represents a hydrogen atom or an alkyl group; $L^{41}$ to $L^{43}$ each independently represent an alkylene group; $R^X$ represents an alkylene group, an alkenylene group, an alkynylene group, an arylene group, —O—, or a divalent linking group combining these; $X^{41}$ to $X^{43}$ each independently represent a halogen ion or an aliphatic or aromatic carboxylic acid ion; and a to c represent molar ratios of the respective unit structures, and a represents 0 to 0.75, while b and c each independently represent 0.25 to 1.00.

8. The functional polymer membrane according to claim 1, wherein a contact angle of water at the membrane surface of the functional polymer membrane is from 80° to 120°.

9. The functional polymer membrane according to claim 1, wherein at 25° C., the surface tension of the composition is from 15 mN/m to 27 mN/m.

10. The functional polymer membrane according to claim 1, further comprising:
a fluorine-based surfactant.

11. A method for producing a functional polymer membrane containing a porous support and a crosslinked polymer electrolyte, the functional polymer membrane being the functional polymer membrane according to claim 1, the method comprising:
impregnating the porous support with a composition including a monomer having a (meth)acrylamide skeleton, and then subjecting the composition to a polymerization curing reaction by irradiating the composition with ultraviolet radiation or/and by heating the composition.

12. The functional polymer membrane according to claim 1, wherein the thickness of the functional polymer membrane is from 10 μm to 90 μm.

13. The functional polymer membrane according to claim 1, wherein the thickness of the functional polymer membrane is from 30 μm to 80 μm.

14. The functional polymer membrane according to claim 1, wherein the thickness of the functional polymer membrane is from 40 μm to 80 μm.

15. The functional polymer membrane according to claim 1, wherein the thickness of the functional polymer membrane is from 40 μm to 78 μm.

* * * * *